US010371912B2

(12) United States Patent
Coenegracht et al.

(10) Patent No.: US 10,371,912 B2
(45) Date of Patent: Aug. 6, 2019

(54) RE-ENTERABLE SEALED ENCLOSURE

(71) Applicant: CommScope Connectivity Belgium BVBA, Kessel-Lo (BE)

(72) Inventors: Philippe Coenegracht, Hasselt (BE); Alexandre Caroline M. De Bie, Beauvechain (BE); Maddy Nadine Frederickx, Aarschot (BE); Paul Joseph Claes, Tremelo (BE); Geert Van Genechten, Vorselaar (BE); Mohamed Aznag, Scherpenheuvel (BE); Diederik Houben, Berbroek (BE); Patrick Jacques Ann Diepstraten, Heusden-Zolder (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 5 days.

(21) Appl. No.: 15/760,208

(22) PCT Filed: Sep. 14, 2016

(86) PCT No.: PCT/EP2016/071735
§ 371 (c)(1),
(2) Date: Mar. 14, 2018

(87) PCT Pub. No.: WO2017/046185
PCT Pub. Date: Mar. 23, 2017

(65) Prior Publication Data
US 2018/0252887 A1 Sep. 6, 2018

Related U.S. Application Data

(60) Provisional application No. 62/383,021, filed on Sep. 2, 2016, provisional application No. 62/326,353, filed
(Continued)

(51) Int. Cl.
*G02B 6/44* (2006.01)
*H02G 15/013* (2006.01)
*H02G 3/08* (2006.01)

(52) U.S. Cl.
CPC .......... *G02B 6/4444* (2013.01); *G02B 6/445* (2013.01); *H02G 3/088* (2013.01); *H02G 15/013* (2013.01); *G02B 6/4455* (2013.01); *G02B 6/4472* (2013.01)

(58) Field of Classification Search
CPC .... G02B 6/4444; G02B 6/445; G02B 6/4455; G02B 6/4472; H02G 3/088; H02G 15/013
(Continued)

(56) References Cited

U.S. PATENT DOCUMENTS 6,118,076 A 9/2000 Damm et al.
7,493,003 B2 2/2009 Kowalczyk et al.
(Continued)

FOREIGN PATENT DOCUMENTS

DE 38 25 756 C1 9/1989
EP 0 442 941 B1 1/1995
(Continued)

OTHER PUBLICATIONS

International Search Report and Written Opinion of the International Searching Authority for corresponding International Patent Application No. PCT/EP2016/071735 dated Mar. 27, 2017, 19 pages.

*Primary Examiner* — Jerry M Blevins
(74) *Attorney, Agent, or Firm* — Merchant & Gould P.C.

(57) ABSTRACT

The present disclosure relates to an enclosure for housing telecommunications equipment. The enclosure can receive a pass-through cable a sealed locations. The enclosure
(Continued)

includes structure that allows re-entry of the enclosure while reducing for reducing or preventing disturbance of the sealed locations.

21 Claims, 24 Drawing Sheets

Related U.S. Application Data on Apr. 22, 2016, provisional application No. 62/289,712, filed on Feb. 1, 2016, provisional application No. 62/267,120, filed on Dec. 14, 2015, provisional application No. 62/218,307, filed on Sep. 14, 2015.

(58) Field of Classification Search
USPC .......................................................... 385/135
See application file for complete search history.

(56) References Cited

U.S. PATENT DOCUMENTS

| | | |
|---|---|---|
| 7,744,288 B2 | 6/2010 | Lu et al. |
| 2004/0156611 A1* | 8/2004 | Cloud .................. G02B 6/4444 |
| | | 385/135 |
| 2005/0271344 A1 | 12/2005 | Grubish et al. |
| 2011/0217017 A1 | 9/2011 | Drouard et al. |

FOREIGN PATENT DOCUMENTS

| | | | | |
|---|---|---|---|---|
| EP | 0 835 546 B1 | 10/2000 | | |
| EP | 0835546 B1 * | 10/2000 | ........... | H02G 15/013 |
| WO | 2014/005917 A2 | 1/2014 | | |
| WO | WO 2014005919 A2 * | 1/2014 | ........... | G02B 6/4444 |
| WO | 2014/128137 A2 | 8/2014 | | |
| WO | 2015/028428 A1 | 3/2015 | | |
| WO | WO 2015028428 A1 * | 3/2015 | ........... | G02B 6/3897 |

* cited by examiner

RE-ENTERABLE SEALED ENCLOSURE

CROSS-REFERENCE TO RELATED APPLICATIONS

This application is a National Stage of PCT/EP2016/071735, filed on Sep. 14, 2016, which claims the benefit of U.S. Patent Application Ser. No. 62/218307, filed on Sep. 14, 2015, and claims the benefit of U.S. Patent Application Ser. No. 62/267120, filed on Dec. 14, 2015, and claims the benefit of U.S. Patent Application Ser. No. 62/289712, filed on Feb. 1, 2016, and claims the benefit of U.S. Patent Application Ser. No. 62/326353, filed on Apr. 22, 2016 and claims the benefit of U.S. Patent Application Ser. No. 62/383021, filed on Sep. 2, 2016 the disclosures of which are incorporated herein by reference in their entireties. To the extent appropriate, a claim of priority is made to each of the above disclosed applications.

BACKGROUND

Telecommunications enclosures are often environmentally sealed and are used to house, manage and protect telecommunications structures such as optical splices, fiber optic connectors, excess optical fiber, passive optical power splitters, wavelength division multi-plexing devices, and other structures. It is desirable for telecommunications enclosures to be re-enterable to allow the structures housed therein to be accessed for maintenance, repair, upgrades, subscriber changes, and system re-configurations. However, re-entering a telecommunications enclosure can be detrimental to cable seals used to seal locations where cables are routed in and out of the enclosure.

SUMMARY

Aspects of the present disclosure relate to telecommunication enclosures (i.e., terminals) having sealing configurations adapted to facilitate re-entering the enclosures while reducing, minimizing or eliminating the disturbance of cable seals used to seal cables (e.g., pass-through cables, drop cables, loop-cables, distribution cables, etc.) routed though the cable seals and into the enclosures.

Some aspects of the disclosure are directed to an enclosure including a first housing piece, a second housing piece, a third housing piece, a first perimeter seal routed along a first perimeter interface for sealing between the first and second housing pieces, and a second perimeter seal routed along a second perimeter interface for sealing between the second and third housing pieces. The second housing piece mates with the first housing piece at the first perimeter interface. The third housing piece mates with the second housing piece at a second perimeter interface that is offset from and independent of the first perimeter interface. The first housing piece defines a first section of a sealing unit mount, which defines a first portion of a cable port. The second housing piece defines a second section of the sealing unit mount that aligns with the first section of the sealing unit mount when the first and second housing piece are mated together at the first perimeter interface. A cable sealing unit mounts in the sealing unit mount. The cable sealing unit includes a cable sealant defining a cable passage that aligns with the cable port of the sealing unit mount for providing a seal about a cable routed into an interior of the enclosure through the cable port and the cable passage. The first perimeter seal makes sealing contact with the cable sealant of the cable sealing unit. The second and third housing pieces can be de-mated without disturbing sealing between the first and second housing pieces and without disturbing the cable sealing unit.

In certain implementations, the third housing piece is a cover that can be removed from the second housing piece to access the interior of the enclosure.

In certain implementations, the second housing piece is disposed between the first and third housing pieces.

In certain implementations, multiple sealing unit mounts are cooperatively defined between the first and second housing pieces. Cable sealing units are mounted at each of the sealing unit mounts.

In certain implementations, the base includes cable management structures that define a cable loop path within the first housing piece for storing a cable loop.

In certain examples, a cable enters the interior of the enclosure through one of the cable sealing units, is looped within the first housing piece, and exits the enclosure through another one of the cable sealing units. In an example, optical fibers of the cable are accessed within the enclosure.

In certain examples, the enclosure contains one or more splice trays for managing optical fiber and for holding optical splices.

In certain examples, the enclosure contains at least one passive optical splitter or at least one wavelength division multiplexing device.

In certain examples, the enclosure includes at least one sealed connector port for receiving a connector from outside the enclosure. The sealed connector port is environmentally sealed when the connector is secured within the connector port.

In certain implementations, the cable sealing unit includes a first sealing block and a second sealing block. The cable passage is defined between the first and second sealing blocks. In certain examples, the first sealing block mounts to the first housing piece and the second sealing block mounts to the second housing piece.

Other aspects of the disclosure are directed to a method of cabling an enclosure including a first set of cable ports disposed along a sealing interface between first and second housing pieces. The method includes: laying a cable along a first cable passage extending over a first sealing block mounted to the first housing piece; routing the cable in a loop through the enclosure; laying the cable along a second cable passage extending over a second sealing block mounted to the first housing piece; mounting the second housing piece to the first housing piece to activate a first environmental seal between the cable and the first and second housing pieces; and accessing the cable through an opening defined in the second housing piece while the second housing piece is mounted to the first housing piece.

In certain implementations, the method includes mounting a third housing piece to the second housing piece to activate a second environmental seal between the second and third housing pieces, thereby environmentally sealing an interior of the enclosure. In certain examples, the method also includes removing the third housing piece from the second housing piece without disturbing the first environmental seal.

In certain implementations, the method includes fixing the first housing piece to the second housing piece so that the first housing piece cannot be removed from the second housing piece. In certain examples, fixing the first housing piece to the second housing piece includes welding the first and second housing pieces together.

In certain implementations, the method includes routing cable media within the enclosure to sealed ports disposed in the enclosure. The sealed ports are separate from the first environmental seal.

In certain implementations, mounting the second housing piece to the first housing piece comprises pressing respective opposing sealing blocks over the first and second sealing blocks to form an environmental seal around the cable.

In other aspects of this disclosure, an enclosure is provided. The enclosure includes a first housing piece defining a sealing unit mount, a second housing piece that mates with the first housing piece at a perimeter interface, a cable sealing unit that mounts within the sealing unit mount, and a perimeter sealing gasket routed along the perimeter interface for sealing between the first and second housing pieces when the first and second housing pieces are mated together at the perimeter interface. The cable sealing unit may include a gel arrangement including first and second volumes of gel that meet at an interface boundary. The first and second volumes of gel are separable from one another at the interface boundary to allow a cable to be routed between the first and second volumes of gel. The perimeter sealing gasket extends across the cable sealing unit and makes contact with the gel arrangement of the cable sealing unit. The perimeter sealing gasket prevents the gel arrangement from contacting the second housing piece.

In some examples, the cable sealing unit includes an actuator for applying a spring load to the gel arrangement when the first and second housing pieces are mounted together.

In some examples, the cable sealing unit includes a sealing unit frame having a first and second mating frame section, wherein the first frame section supports the first volume of gel, and the second frame section supports the second volume of gel. The first and second mating frame sections can cooperate to define at least one cable port in alignment with the interface boundary defined between the first and second volumes of gel.

In certain implementations, the enclosure defines a perimeter channel for receiving the perimeter sealing gasket, wherein a majority of the perimeter channel is defined by the first housing piece and wherein the first frame section defines a channel segment that forms a portion of the perimeter channel. The channel segment defines a channel volume that is in communication with the first volume of gel.

In one or more examples, the cable sealing unit includes an actuator for applying a spring load to the gel arrangement when the first and second housing pieces are mounted together. The first frame section can define an actuator opening in communication with the first volume of gel, and the actuator can include a plunger that fits within the actuator opening. The plunger is slidable within the actuator opening to pressurize the gel arrangement within the spring load when the first and second housing pieces are mounted together.

In some implementations, the second frame section defines a channel segment that aligns with the channel segment of the first frame section. The channel segment of the first frame section can include an open side that faces away from the first housing piece, and the channel segment of the second frame section can face toward the first housing piece. The first housing piece may include a projection that mates with the channel segment of the second frame section.

In one or more embodiments, the enclosure has at least one corner, and the sealing unit mount is located at the corner of the enclosure. The channel segment of the first frame section can coincide with the corner of the enclosure and include a curved portion at the corner of the enclosure.

Another aspect relates to an enclosure including a first housing piece defining a sealing unit mount, and a second housing piece that mates with the first housing piece at a perimeter interface. The enclosure also includes a cable sealing unit that mounts within the sealing unit mount. The cable sealing unit includes a gel arrangement including first and second volumes of gel that meet at an interface boundary. The first and second volumes of gel are separable from one another at the interface boundary to allow a cable to be routed between the first and second volumes of gel. The enclosure includes a perimeter sealing gasket routed along the perimeter interface for sealing between the first and second housing pieces when the first and second housing pieces are mated together at the perimeter interface. The perimeter sealing gasket extends across the cable sealing unit makes contact with the gel arrangement of the cable sealing unit. The perimeter sealing gasket prevents the gel arrangement from contacting the second housing piece.

Another aspect of the present disclosure relates to an enclosure including a first housing piece defining a sealing unit mount, and a second housing piece that mates with the first housing piece at a perimeter interface. The enclosure also includes a cable sealing unit that mounts within the sealing unit mount. The cable sealing unit includes a gel arrangement. The enclosure also includes a perimeter sealing gasket routed along the perimeter interface for sealing between the first and second housing pieces when the first and second housing pieces are mated together at the perimeter interface. The perimeter sealing gasket extends across the cable sealing unit and makes contact with the gel arrangement of the cable sealing unit. The perimeter sealing gasket prevents the gel arrangement from contacting the second housing piece.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to a re-enterable enclosure having a sealed cable port through which a cable can enter the enclosure. The enclosure is configured to enable access to the interior without disturbing the sealed cable port. In certain examples, the enclosure defines multiple sealed cable ports that are not disturbed when the enclosure interior is accessed. In certain examples, the sealed cable port is configured to accommodate cables of various sizes using the same sealing block units at the cable ports. In certain examples, various types of equipment (e.g., optical splices, an optical splitter, an optical multiplexer/de-multiplexer, an optical-to-electrical converter, etc.) can be disposed within the enclosure interior.

Figure 1:
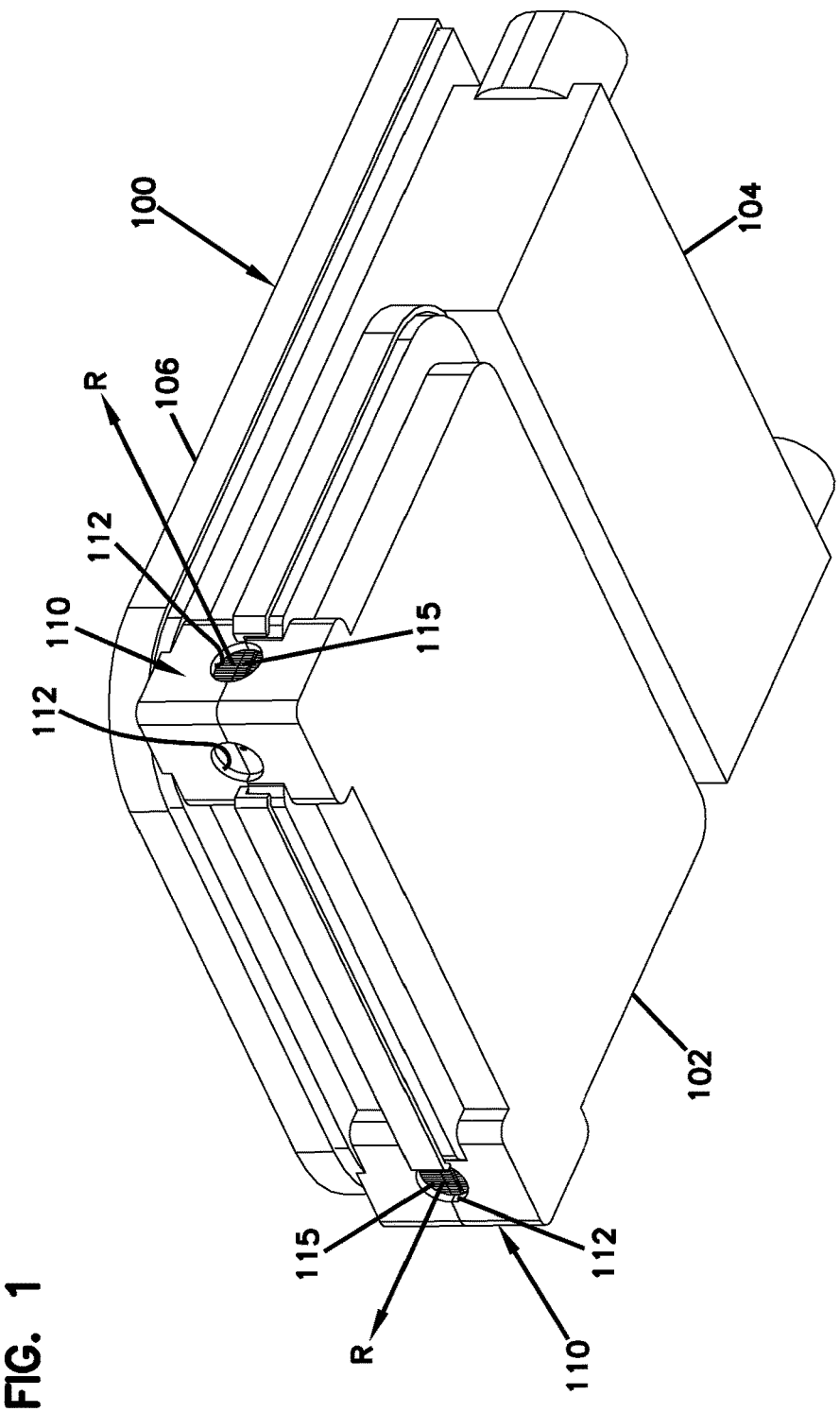
FIG. 1 is a perspective view of an example enclosure including a first housing piece and a second housing piece sealed together at a first interface and a third housing piece sealed to the second housing piece at a second interface.
Figure 2:
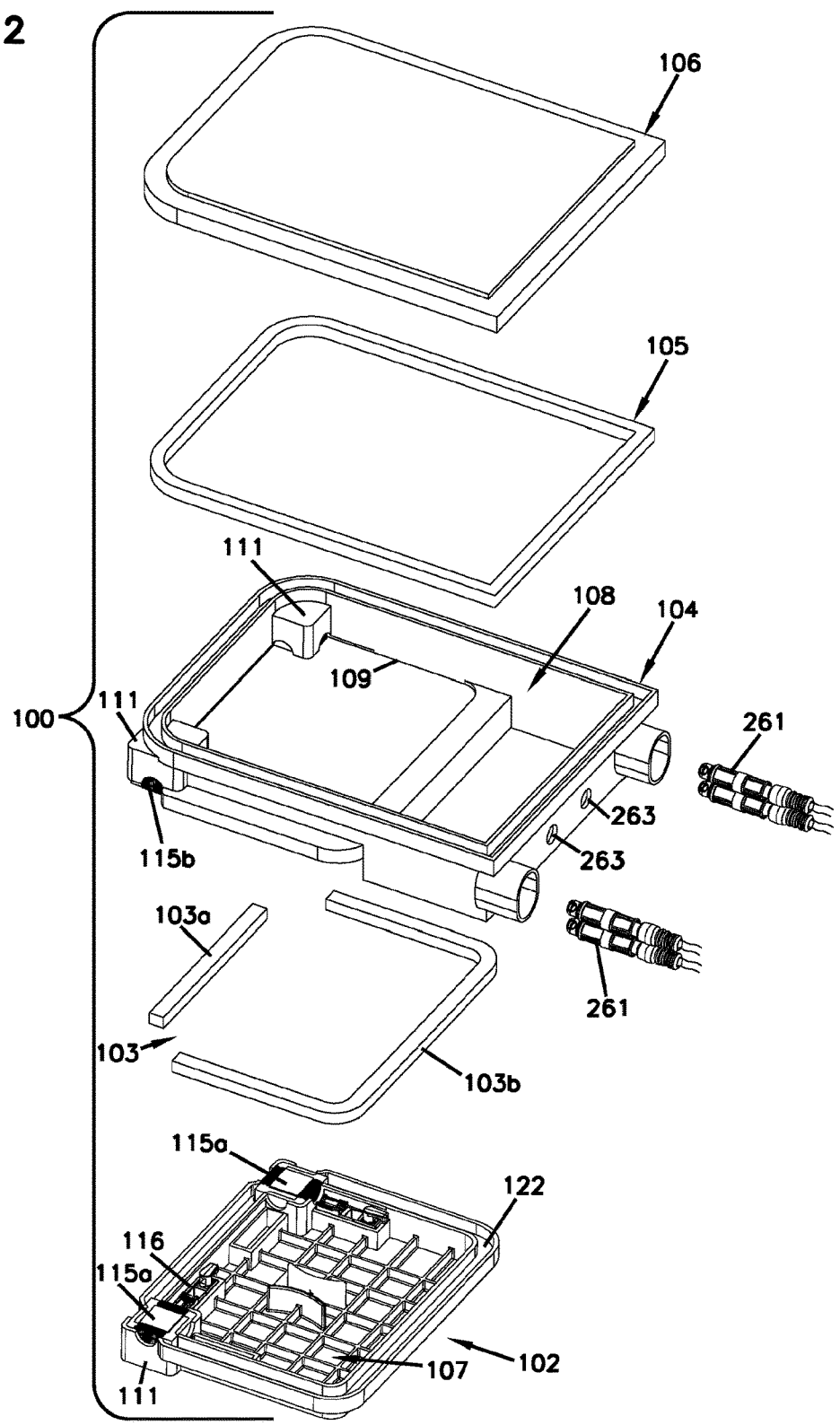
FIG. 2 is a top perspective view of the enclosure of FIG. 1 with the components exploded away from each other.
Figure 3:
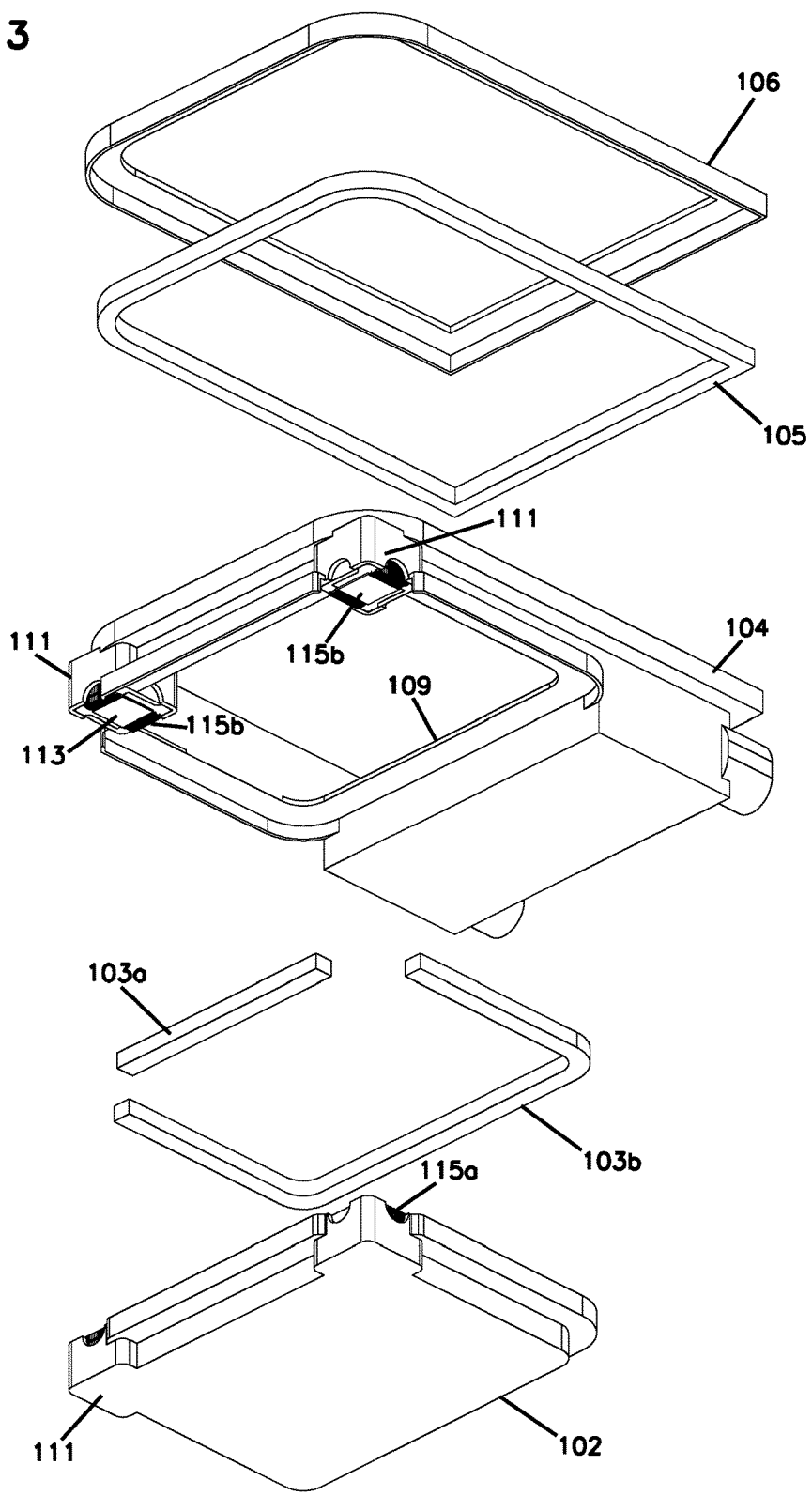
FIG. 3 is a bottom perspective view of the exploded enclosure of FIG. 2.

FIGS. 1-3 illustrate an enclosure 100 including a first housing piece 102 (e.g., a base), a second housing piece (e.g., an intermediate housing piece) 104, and a third housing piece (e.g., a cover) 106. A first perimeter seal 103 is routed along a first perimeter interface for sealing between the first and second housing pieces 102, 104. A second perimeter seal 105 is routed along a second perimeter interface for sealing between the second and third housing pieces 104, 106. The second housing piece 14 mates with the first housing piece 102 at the first perimeter interface. The third housing piece 106 mates with the second housing piece 104 at a second perimeter interface that is offset from and independent of the first perimeter interface.

The first housing piece 102 and the second housing piece 104 can cooperate to define a first interior 107. One or more cables (e.g., optical cables, electrical cables, hybrid cables, etc.) can be routed into the first interior 107. In some implementations, the second housing piece 104 fully closes the first interior 107 when mated with the first housing piece 102. In such implementations, the first interior 107 is environmentally sealed from an exterior of the enclosure 100. However, in other implementations, the second housing piece 104 defines an opening 109 that provides access to the first interior 107 even when the second housing piece 104 is mated to the first housing piece 102.

The second housing piece 104 and the third housing piece 106 can cooperate to define a second interior 108. One or more cables (e.g., optical cables, electrical cables, hybrid cables, etc.) can be routed into the second interior 108. In some implementations, the opening 109 defined by the second housing piece 106 joins the first interior 107 and the second interior 108 into an enclosure interior. Accordingly, at least a portion of the first interior 107 can be accessed through the second interior 108.

In some implementations, the third housing piece 106 is a cover of the enclosure 100. The cover 106 is removable from the second housing piece 106 to access the interior of the enclosure 100. In certain implementations, the second housing piece 104 is disposed between the first housing piece 102 and the third housing piece 106. In other implementations, the first and third housing pieces 102, 106 can be located on a common side of the second housing piece 104.

The first housing piece 102 defines a first section 111 of a sealing unit mount 110, which defines a first portion of a cable port 112. The second housing piece 104 defines a second section 111 of the sealing unit mount 110 that aligns with the first section 111 of the sealing unit mount 110 when the first and second housing piece 102, 104 are mated together at the first perimeter interface. In some implementations, the first and second housing pieces 102, 104 cooperate to define multiple sealing unit mounts 110. In certain examples, the sealing unit mounts 110 are located at corners of the enclosure 100.

A cable sealing unit 115 mounts in the sealing unit mount 110. The cable sealing unit 115 includes a cable sealant 113 defining a cable passage R that aligns with the cable port 112 of the sealing unit mount 110 for providing a seal about a cable routed into an interior of the enclosure 100 through the cable port 112 and the cable passage R. The first perimeter seal 103 makes sealing contact with the cable sealant 113 of the cable sealing unit 115. The second and third housing pieces 104, 106 can be de-mated without disturbing sealing between the first and second housing pieces 102, 104 and without disturbing sealing between the cable sealing unit 115 and the cable routed therethrough. The cable ports 112 can have wrap-around configurations that allow cables to be inserted laterally into the cable ports (e.g., inserted in from the top side, bottom side, left side or right side) without having to thread the cables axially through the cable ports 112. For example, when the first and second housing pieces are de-mated, a cable can be inserted/laid downwardly into the half-port defined by the first housing piece and then fully enclosed within the cable port when the first and second housing pieces are mated together. In other words, the cable can be inserted into one of the half ports of the first and second housing pieces when the first and second housing pieces are de-mated. Subsequently, when the first and second housing pieces are mated together, the cable is captured between the half-port defined by the first housing piece and the half-port defined by the second housing piece.

In certain implementations, multiple sealing unit mounts 110 are cooperatively defined between the first and second housing pieces 102, 104. In certain examples, cable sealing units 115 are mounted at each of the sealing unit mounts 110. In certain implementations, one or more of the sealing unit mounts 110 defines a plurality of cable ports 112 that face is in different directions. Accordingly, a cable can enter the enclosure 110 at one of the sealing unit mounts 110 from a desired one of multiple possible directions. Accordingly, the cable can be routed into the enclosure 100 in an in-line configuration, a butt-style configuration, and an angled configuration. The cable enters the enclosure 100 in an in-line configuration when the cable extends linearly through the enclosure interior between two coaxial cable ports 112. The cable enters the enclosure 100 in a butt-style configuration when the cable extends in a loop between two cable ports 112 that face in a common direction. The cable enters the enclosure 100 in an angled configuration when the cable extends within the enclosure 100 between two non-coaxial cable ports 112 that face in different directions.

Figure 4:
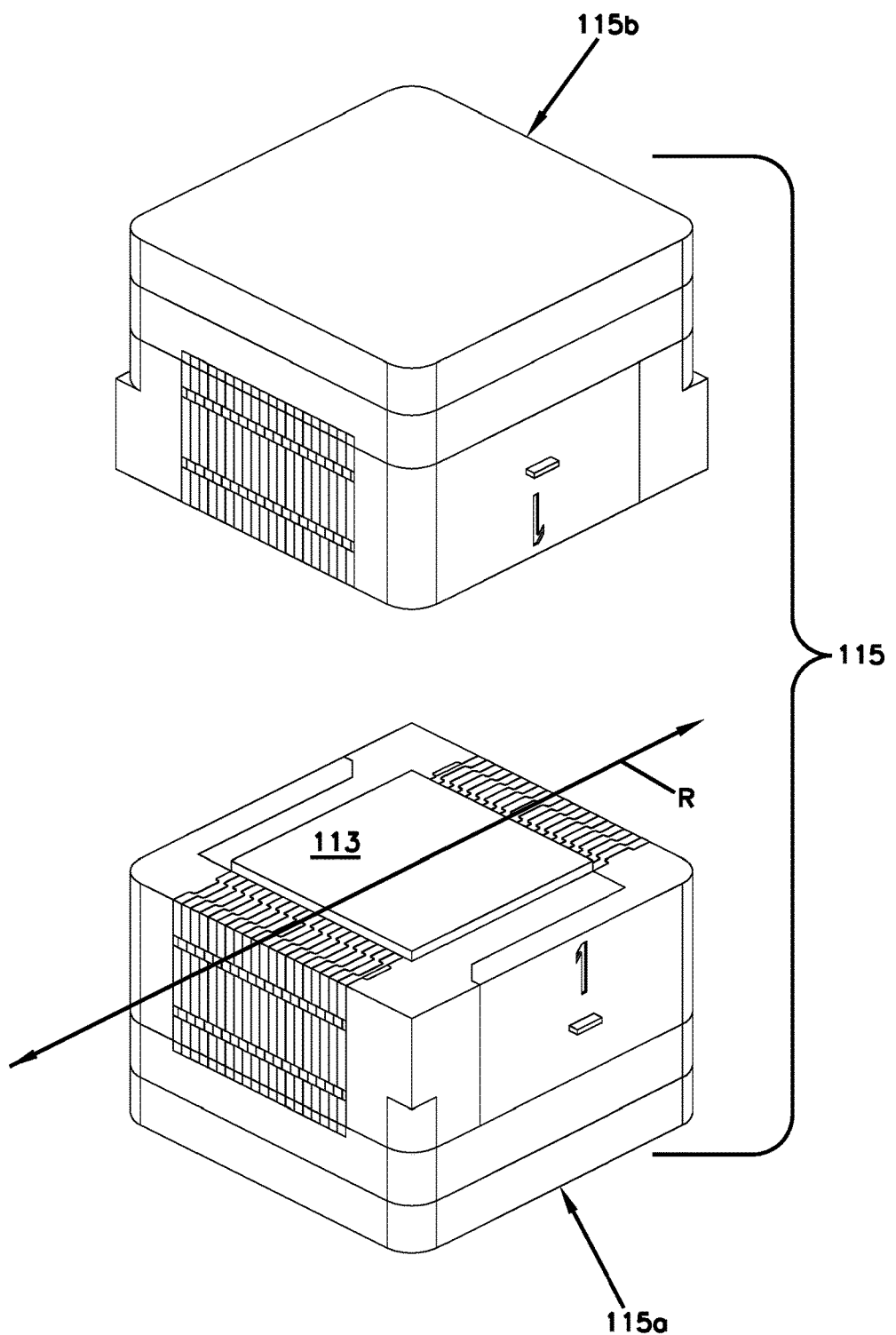
FIG. 4 is a perspective view of an example sealing unit suitable for use with the enclosure of FIG. 1.
Figure 5:
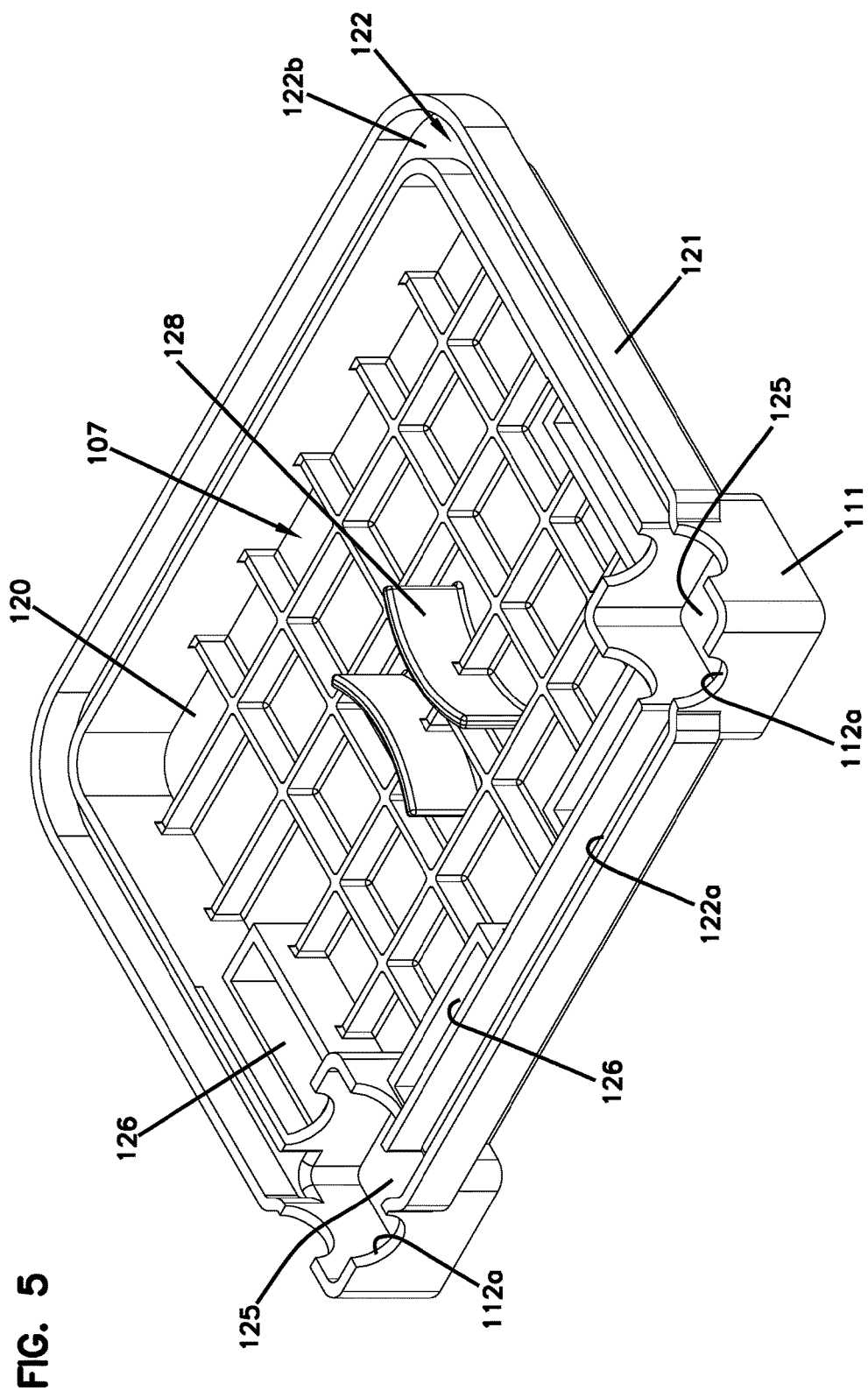
FIG. 5 is a top perspective view of an example first housing piece suitable for use with the enclosure of FIG. 1.

FIG. 5 illustrates one example first housing piece 102 suitable for use with the enclosure 100 of FIGS. 1-4. The first housing piece 102 includes a sidewall 121 extending upwardly from a base 120. A gasket channel arrangement 122 extends about a periphery of the first housing piece 102. For example, the channel arrangement 122 can extend along a top of the sidewall 121. In certain implementations, one or more sections 111 of the sealing unit mounts 110 are disposed along the channel arrangement 122. For example, each section 111 can define a receptacle 125 that divides the channel arrangement 122. In the example shown, two receptacles 125 divide the channel arrangement 122 into a first channel 122a and a second channel 122b.

As shown in FIG. 4, each cable sealing unit 115 includes a first sealing block 115a and a second sealing block 115b. Each sealing block 115a, 115b includes a volume of sealant 113. The first sealing block 115a is disposed in the receptacle 125 of the sealing unit mount section 111 of the first housing piece 102 (FIG. 2). The second sealing block 115b is disposed in the receptacle 125 of the sealing unit mount section 111 of the second housing piece 104 (FIG. 3). The volumes of sealant 113 oppose and contact each other when the second housing piece 104 is mounted to the first housing piece 102. The sealant 113 provides an environmental seal around any cable extending between the sealing blocks 115a, 115b along the cable passage R.

In certain implementations, the sealing mount receptacle 111 defines a portion 112a of a cable port 112 with which the cable passage R aligns when the sealing block 115a is disposed in the receptacle 125. In certain examples, the sealing mount receptacle 111 defines portions 112a of multiple cable ports 112. For example, the sealing mount receptacle 111 may define a first cable port portion 112a facing from a first side of the enclosure 100 and a second cable port portion 112a facing from another side of the enclosure 100. In certain implementations, anchor block mounts 126 also are disposed within the first interior of the first housing piece 102. For example, an anchor block mount 126 can be found aligned with each cable port portion 112a. An anchor block 116 can be mounted at each anchor block mount 126 to axially fix a cable to the enclosure 100.

In certain implementations, a majority of the volume of the first interior 107 is defined by the first housing piece 102. In certain implementations, the first housing piece 102 includes cable management structures 128 disposed within the first interior 107. For example, the cable management structures 128 can include bend radius limiters, cable spools, hooks, clips, or other such structures that define a cable loop path within the first housing piece 102 for storing a loop of cable.

In certain examples, a cable enters the first interior 107 of the enclosure 100 through one of the cable sealing units 115, is looped within the first interior 107, and exits the enclosure 100 through another one of the cable sealing units 115. In an example, optical fibers of the cable are accessed within the enclosure 100. For example, the optical fibers may be accessed within the first interior 107.

Figure 6:
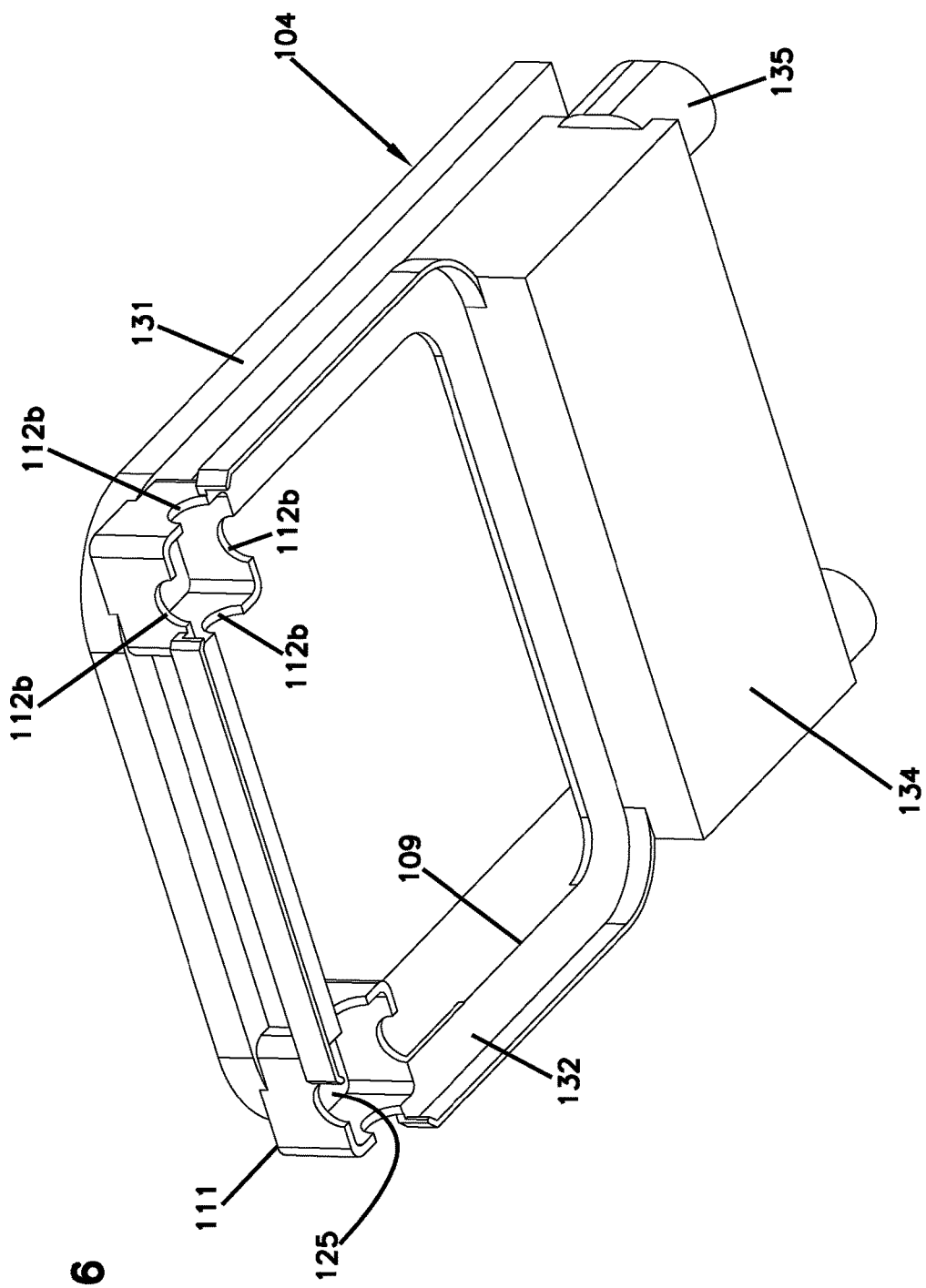
FIG. 6 is a bottom perspective view of an example second housing piece suitable for use with the enclosure of FIG. 1.
Figure 7:
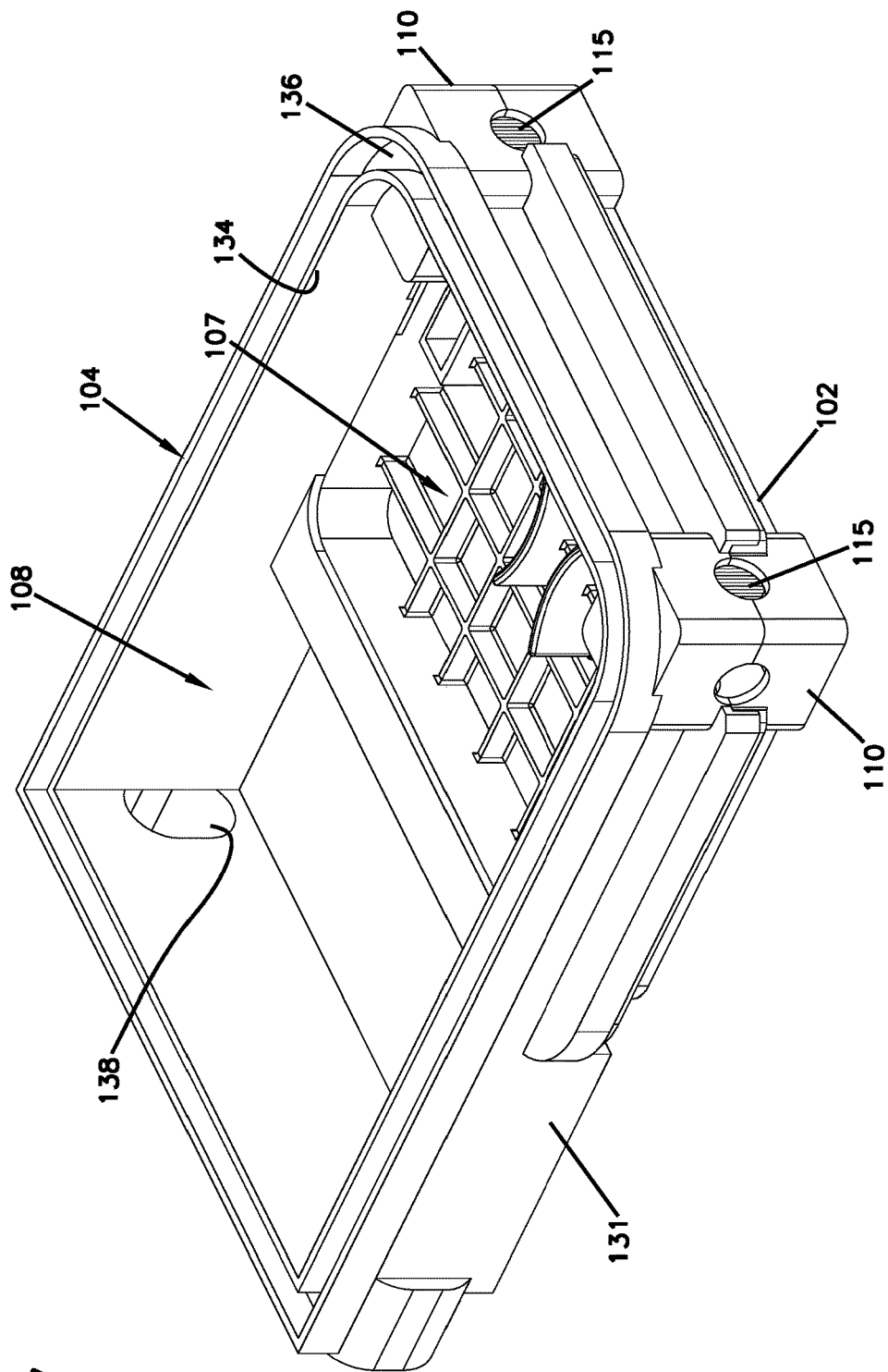
FIG. 7 is a top perspective view of the second housing piece of FIG. 6 mounted to the first housing piece of FIG. 5.
Figure 8:
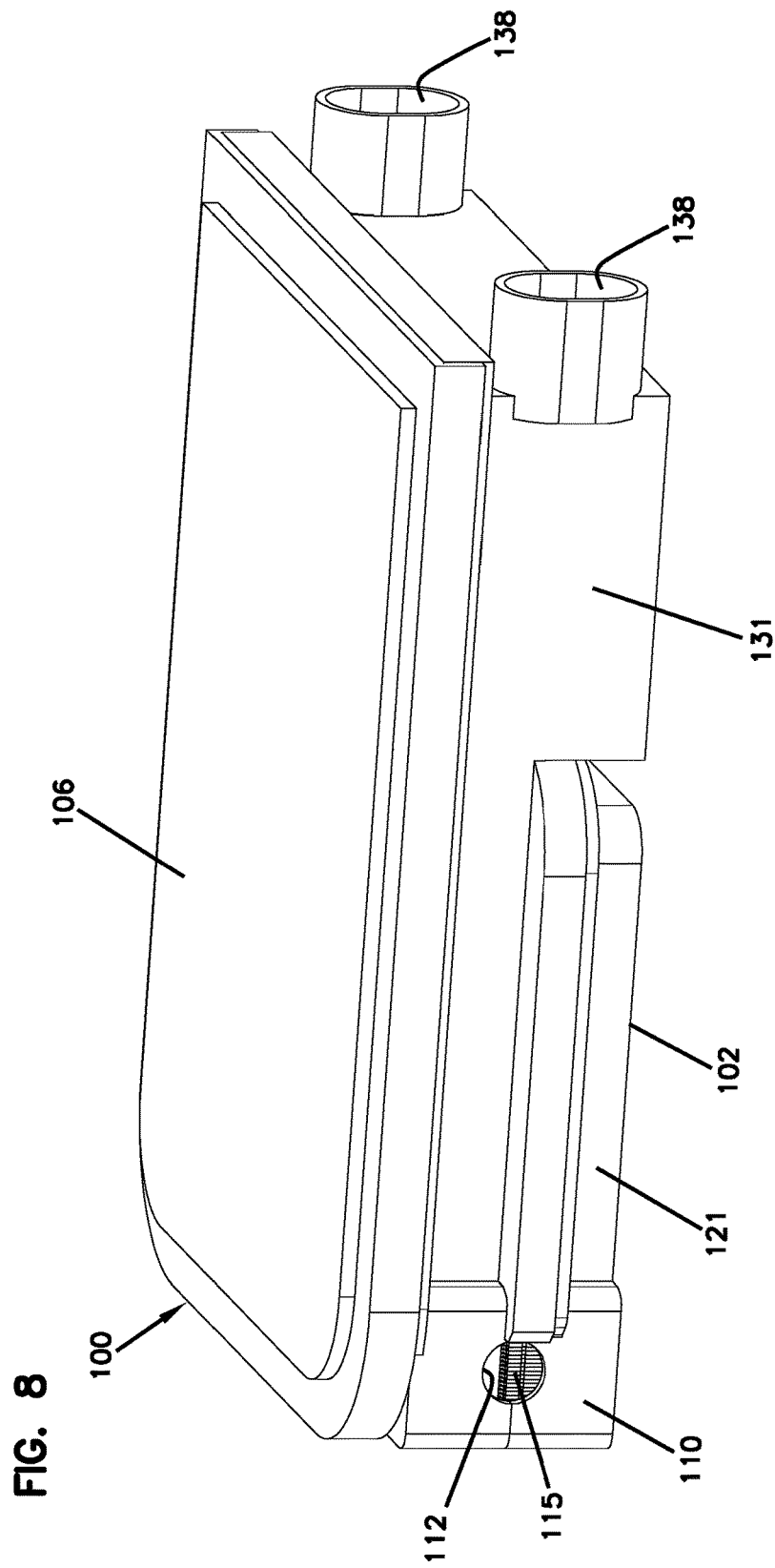
FIG. 8 is a top perspective view of an example third housing piece mounted to the second housing piece of FIG. 7.
Figure 9:
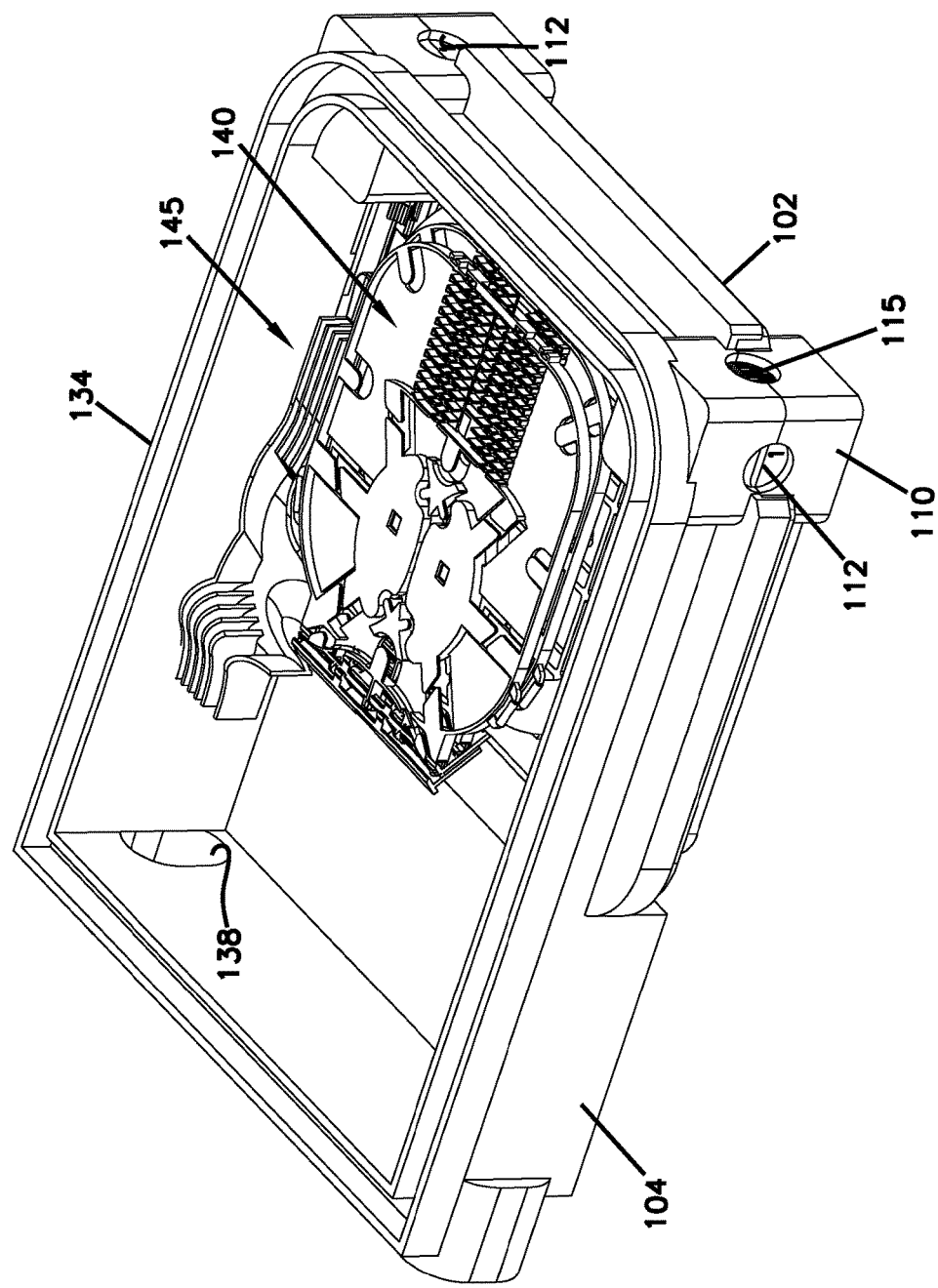
FIG. 9 is a top perspective view of the enclosure of FIG. 1 with the third housing piece removed to ease in viewing equipment disposed within the interior of the enclosure.

FIGS. 6 and 7 illustrate one example second housing piece 104 suitable for use with the enclosure 100 of FIGS. 1-4. The second housing piece 104 includes a sidewall 131 defining a first opening 109 and a second opening 134. In some implementations, the first and second openings 109, 134 are located at opposite ends of the sidewall 131. In certain implementations, the first opening 109 is smaller than the second opening 134. In certain examples, the first opening 109 is coextensive with a portion of the second opening 134.

A first sealing surface 132 surrounds the first opening 109 to define part of the first perimeter interface. The first sealing surface 132 opposes the gasket channel arrangement 122 of the first housing piece 102 when the second housing piece 104 mounts to the first housing piece 102. In certain implementations, one or more sections 111 of the sealing unit mounts 110 are disposed along the first sealing surface 132. For example, each section 111 can define a receptacle 125 that divides the first sealing surface 132 into multiple sealing surfaces. In the example shown, two receptacles 125 divide the first sealing surface 132 into a first sealing surface and a second sealing surface.

In accordance with aspects of the disclosure, the cable passage R passes between the gasket channel arrangement 122 and the first sealing surface 132. Separating the first housing piece 102 from the second housing piece 104 opens the cable passage R. Accordingly, removing the first housing piece 102 from the second housing piece 104 would unseal any cables routed through the cable sealing unit 115. In accordance with some aspects of the disclosure, the first housing piece 102 is not removed from the second housing piece 104 after the cable has been routed into the enclosure 100 along the cable passage R.

As shown in FIG. 7, in some implementations, a second gasket channel 136 surrounds the second opening 134 to define part of the second perimeter interface. The second gasket channel 136 is configured to receive the second perimeter seal 105. In other implementations, a second sealing surface surrounds the second opening 134 and opposes a gasket channel defined in the third housing piece 106 when the third housing piece 106 is mounted to the second housing piece 104. No cable seal units 115 are disposed along the second gasket channel 136. Accordingly, removing the third housing piece 106 from the second housing piece 104 would not disturb any cables routed through the cable sealing units 115 of the enclosure 100.

Mounting the third housing piece 106 to the second housing piece 104 closes the second interior 108. In certain implementations, mounting the third housing piece 106 to the second housing piece 104 closes the first and second interiors 107, 108. In some implementations, the second housing piece 104 defines a majority of the second volume 108. In certain implementations, the second housing piece 104 is larger than the first housing piece 102. In certain implementations, a periphery of the second housing piece 104 and the second interior 108 extend beyond the periphery of the first housing piece 102.

In some implementations, additional cables can be routed into the enclosure 100 through cable ports 138 disposed between the first and second perimeter interfaces. For example, one or more cable ports 138 can be defined by the sidewall 131 of the second housing piece 104. In certain implementations, the cable ports 138 are environmentally sealed. However, none of the cable ports 138 engage any portion of the first perimeter seal 103 or the second perimeter seal 105. Accordingly, the removal of the third housing piece 106 from the second housing piece 104 would not disturb the cable seals at the cable ports 138. Further, the removal of the first housing piece 102 from the second housing piece 104 would not disturb the cable seals at the cable ports 138.

In accordance with some aspects of the disclosure, media (e.g., optical fibers, electrical conductors, etc.) of a cable entering the enclosure 100 at a cable port 138 (e.g., in the second interior 108) can be connected to media of a cable entering the enclosure 100 at a cable port 112 (e.g., in the first interior 107). In certain implementations, various types of equipment can be disposed within the enclosure 100 to manage the media of cables entering the enclosure 100. For example, cable spools or guides can be disposed within the first and/or second interiors 107, 108 to manage/store the cable media. In certain examples, guides 145 can be provided to route cable media between the first and second interiors 107, 108.

In some examples, the enclosure 100 contains one or more splice trays 140 for managing optical fiber and for holding optical splices. In such examples, an optical fiber of a first cable sealed by the cable sealing unit 115 can be spliced to an optical fiber of a second cable sealed at the port 138. In other examples, the enclosure 100 contains at least one passive optical splitter or at least one wavelength division multiplexing device that can be optically coupled to optical fibers of the cables. In still other examples, an optical-to-electrical converter is disposed in the enclosure 100.

Figure 10:
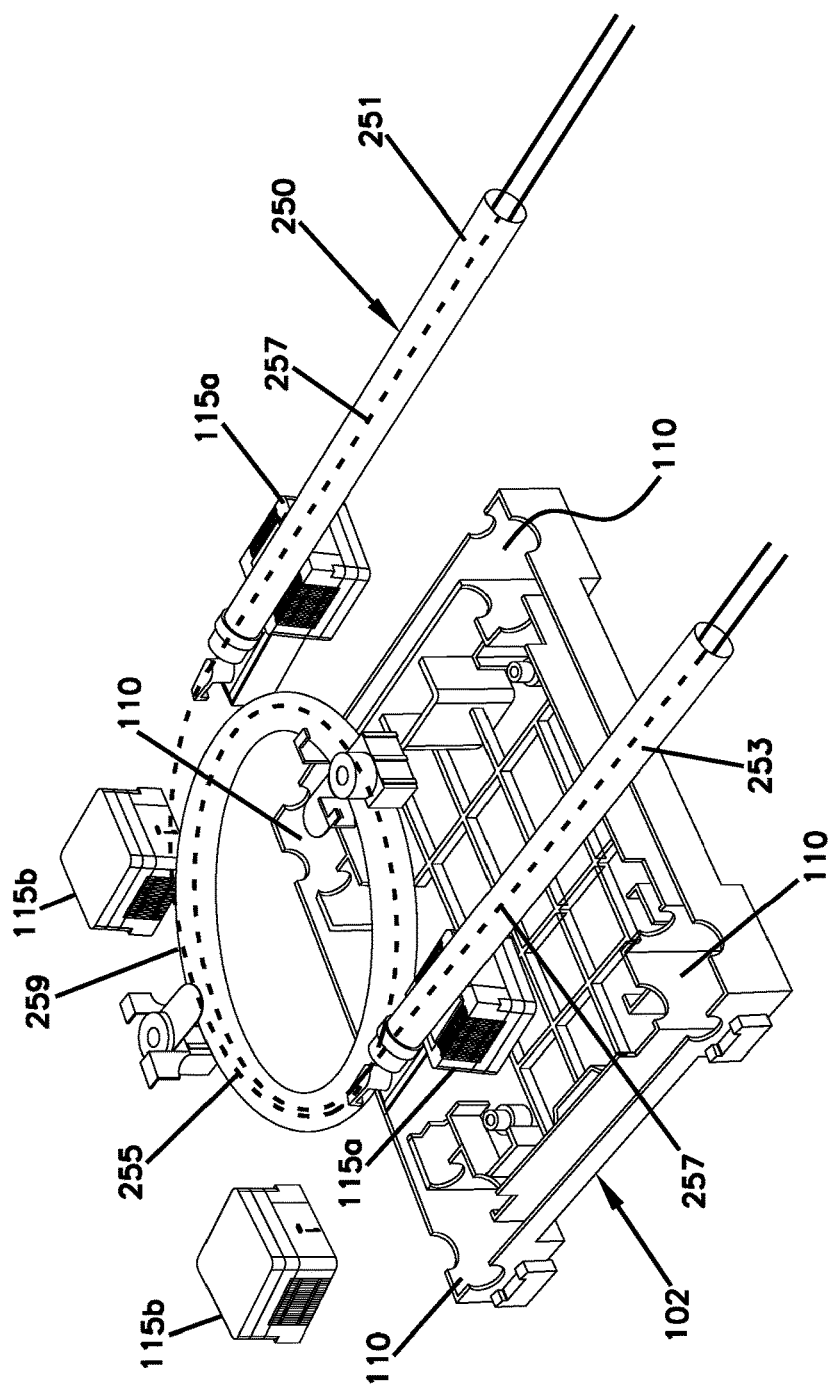
FIG. 10 shows an arrangement for routing a loop of a pass-through cable within a housing piece (e.g., a base) of an example telecommunications enclosure.

FIG. 10 shows an example configuration for the first housing piece 102 (e.g., the base) which has sections 111 of sealing mounts 110 at the corners. The sealing mounts could also be at other positions such as along the sides. Sealing units 115 are provided at the sealing mounts 110. The sealing units 115 preferably include gel. The gel preferably includes volumes or blocks of gel. The sealing units 115 (including parts 115a, and 115b) are configured for sealing cables routed into the enclosure. For example, pass-through cable 250 can be routed into and out of the enclosure and can be or is sealed by the sealing units 115. The pass-through cable includes first and second cable sections 251, 253 that can be or are routed into the enclosure preferably each through a separate sealing unit 115. The cable sections 251, 253 can be arranged in a butt style (where both enter/exit the enclosure at the same side of the enclosure), an in-lines style (where the cable sections 251, 253 are in-line and enter/exit the enclosure though opposite side of the enclosure), and an offset style (where the cable sections are offset (i.e., not co-axially aligned from each other and enter/exit the enclosure through opposite sides of the enclosure). Optical fibers 257 of the pass-through cable 250 that extend between the cable sections 251, 253 can be managed and stored within the enclosure. The optical fibers can be routed in along a storage loop 255 within the enclosure. The storage loop 255 can be defined by a defined loop structure 259 (e.g., a fixed-shaped ring, housing or tube defining a continuous path such as generally circular shape, race-track shape, elliptical shape, obround shape, etc.), by a spooling or coiling structure, by bend radius limiters or by other fiber guide structures. Preferably, the cable jacket has been removed from the optical fibers 257 in the region between the sections 251, 253. Some of the optical fibers 257 can be accessed within the enclosure for splicing or connectorization. The remainder of the fibers 257 can pass through the enclosure and run uninterrupted between the first and second cable sections 251, 253. The cable sections 251, 253 can be anchored or fixed to the enclosure (preferably to the base) adjacent to the sealing units 115. For example, the cable sections 251, 253 can be clamped, strapped or fastened to cable fixation structures 255 that preferably attach or mount to the housing of the enclosure such as to the base, for example. Preferably the fixation structures 255 attach to the housing via snap-fit connections. For ease of access, the cable sections 251, 253 can be secured to the cable fixation structures 255 before the fixation structures 255 are secured to the housing, and the cable fixation structures 255 can be secured to the housing after the cable sections 251, 253 have been secured to the cable fixation structures 255. Sealing units have not been shown for the two back sealing unit mounts 110.

Figure 11:
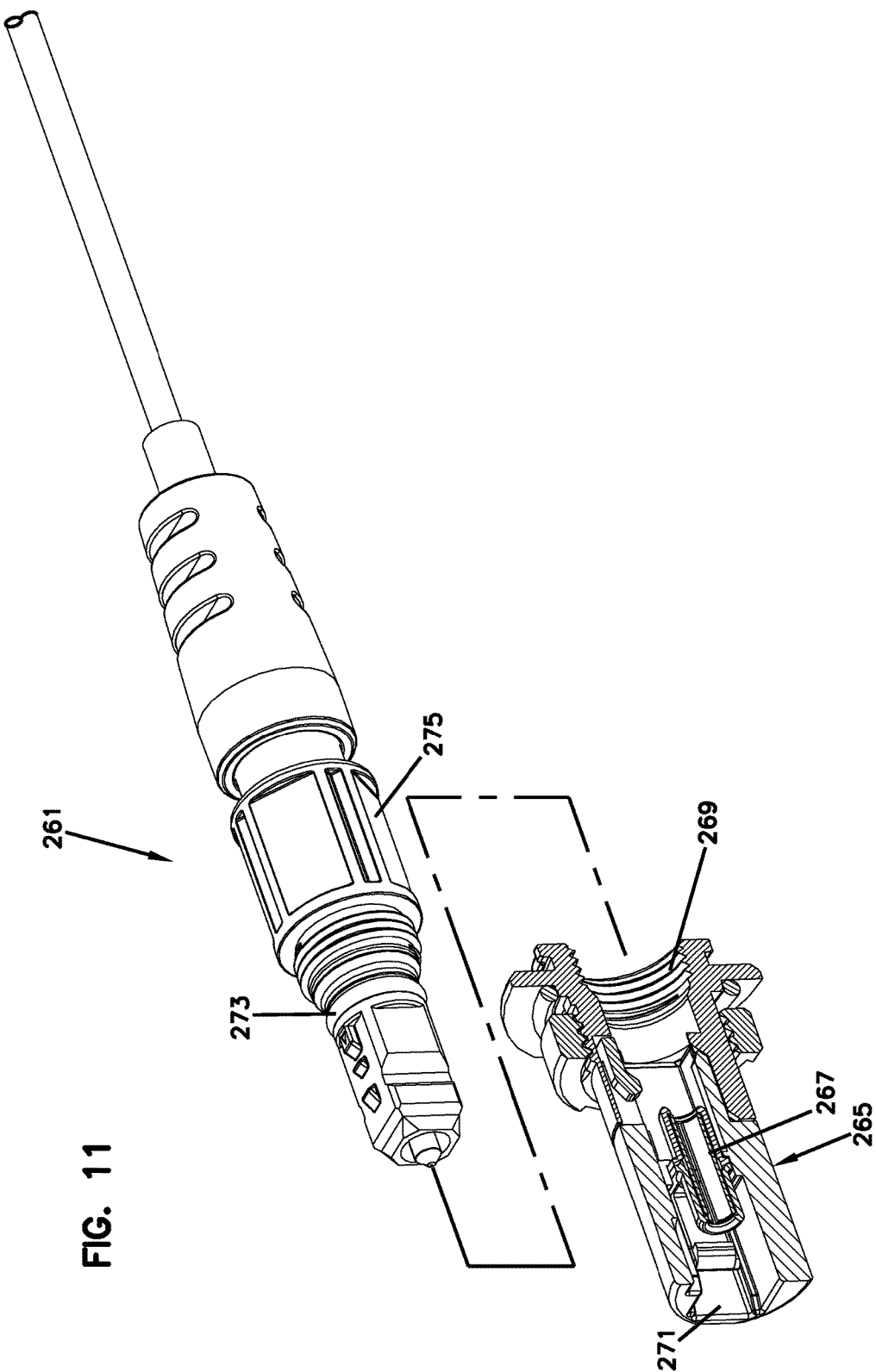
FIG. 11 shows an example ruggedized connector port that can be used with enclosures in accordance with the principles of the present disclosure.

It will be appreciated that the ports 138 can contain or include sealing structures or sealant (e.g., gel) for sealing around cables (e.g., drop cables) routed therethrough. The cables can include fibers that optically couple to optical fibers 257 of the pass-through cable 250 that have been accessed within the enclosure. The optical fibers of the cables routed through the ports 138 can be spliced to the accessed optical fibers 257 at a splice tray (e.g., tray 140) or can be connectorized and connected to accessed optical fibers 257 that have been connectorized. The connectorized connections can take place at fiber optic adapters positioned within the enclosure. The optical fibers can be connectorized by ruggedized connectors 261 or non-ruggedized fiber optic connectors (e.g., SC type connectors, LC type connectors, etc.). An example ruggedized fiber optic connector is shown at U.S. Pat. No. 7,744,288 which is hereby incorporated by reference in its entirety. In certain examples, the enclosure 100 can define at least one opening 263 or a plurality of openings for mounting ruggedized adapters. An example ruggedized adapter 265 is shown at FIG. 11. The adapter 265 is described in detail in U.S. Pat. No. 7,744,288 which has been incorporated herein by reference. The adapter 265 is sealed relative to the enclosure and houses an internal ferrule alignment sleeve 267 for receiving and co-axially aligning ferrules of optical connectors desired to be mated and optically coupled. Other fiber alignment structures for aligning optical fibers of optical connectors can also be used. The adapter includes a ruggedized outer port 269 for receiving a ruggedized connector 261 from outside the enclosure and a non-ruggedized port 271 for receiving a non-ruggedized fiber optic connector (e.g., as described above) from inside the enclosure. The connector within the enclosure is preferably coupled to one of the optical fibers 257. The ruggedized connector 261 can include a seal 273 and a robust fastener 275 for securing the connector within the ruggedized port 271. The robust fastener is preferably a twist to lock fastener such as a threaded fastener/coupler or a bayonet-type fastener/coupler.

Figure 12:
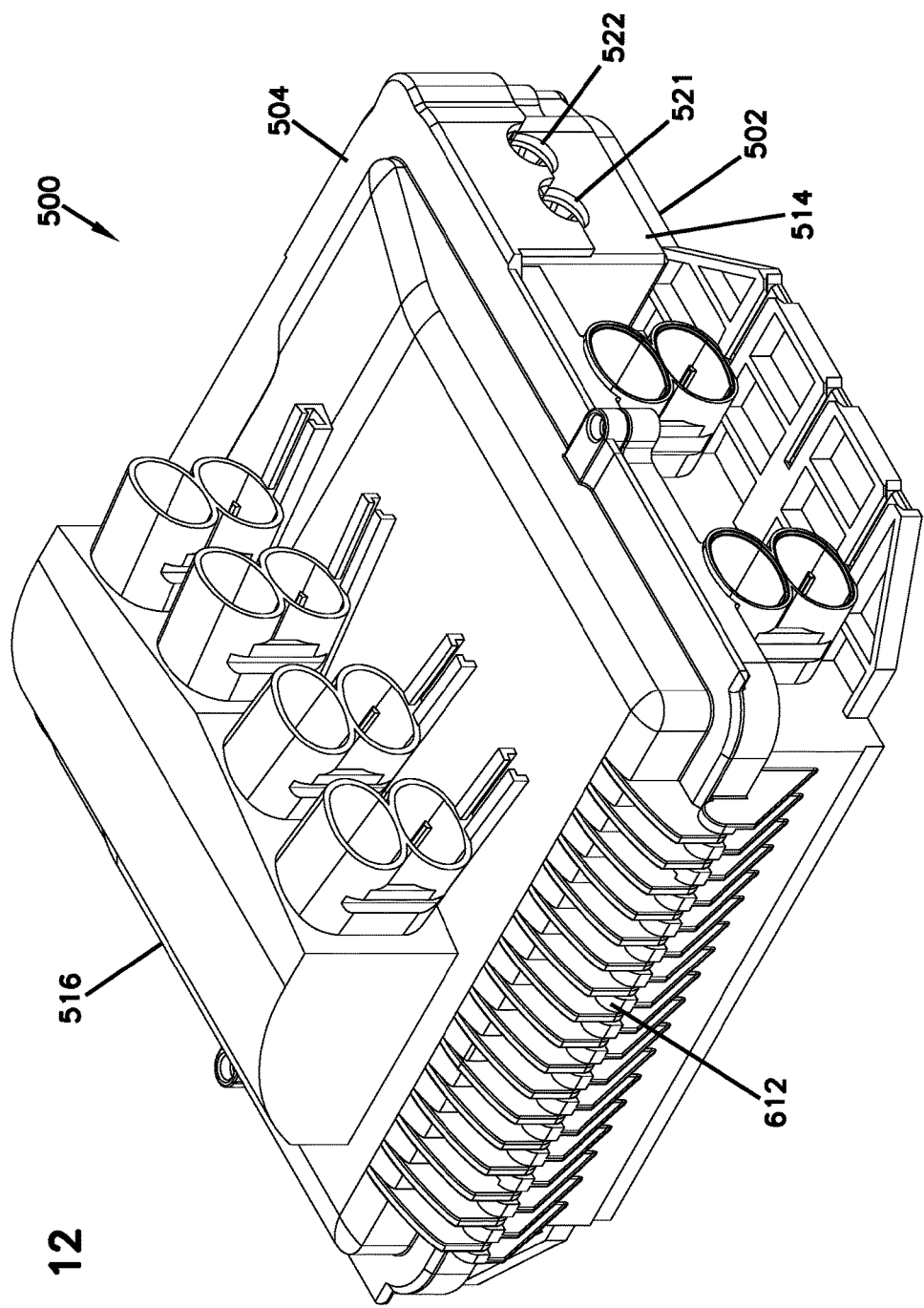
FIG. 12 is a perspective view of another example enclosure including a first housing piece and a second housing piece mated together at a perimeter interface, constructed in accordance with the principles of this disclosure.

FIG. 12 illustrates another enclosure 500 constructed in accordance with the principles of this disclosure. The enclosure 500 has a sealed cable port through which a cable can enter the enclosure. The enclosure 500 is configured to enable access to the interior without disturbing the sealed cable port. The enclosure can include multiple sealed cable ports that are not disturbed when the enclosure interior is accessed.

Figure 13:
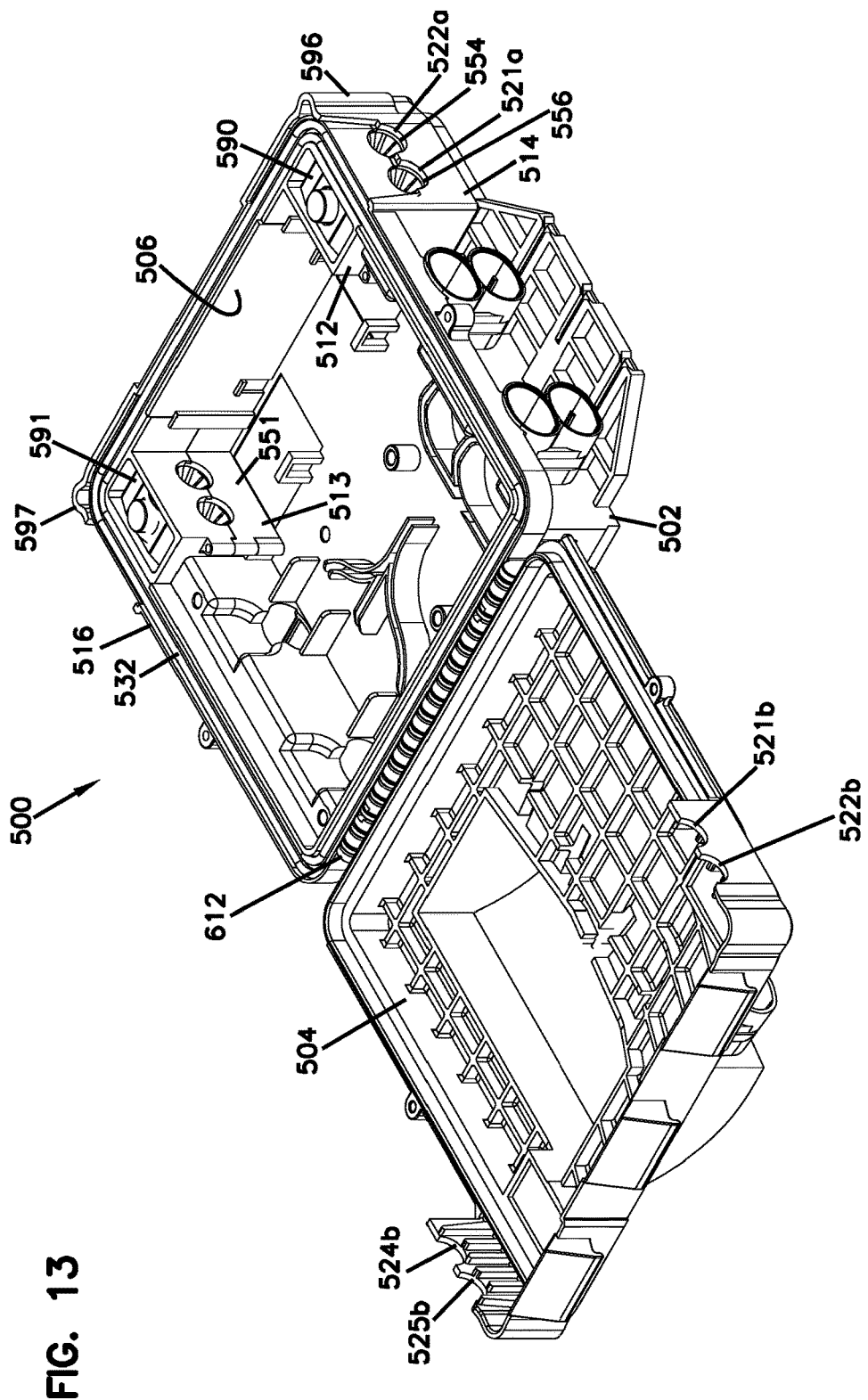
FIG. 13 is a perspective view of the enclosure of FIG. 12 opened, with the second housing piece pivoted away from the first housing piece and depicting internal components.

In FIG. 12, the enclosure 500 includes a first housing piece 502 (e.g., a base), and a second housing piece 504 (e.g., a cover). In this embodiment, the enclosure 500 does not include an intermediate housing piece, although additional housing pieces could be used in alternative arrangements, but the one shown is convenient and leads to advantages. The first housing piece 502 and second housing piece 504 may be removably mated together to provide selective enclosure and access to an interior volume 506 defined by the two housing pieces 502, 504 when operably mated together. FIG. 13 shows a portion of the interior volume 506 defined by the first housing piece 502.

Figure 15:
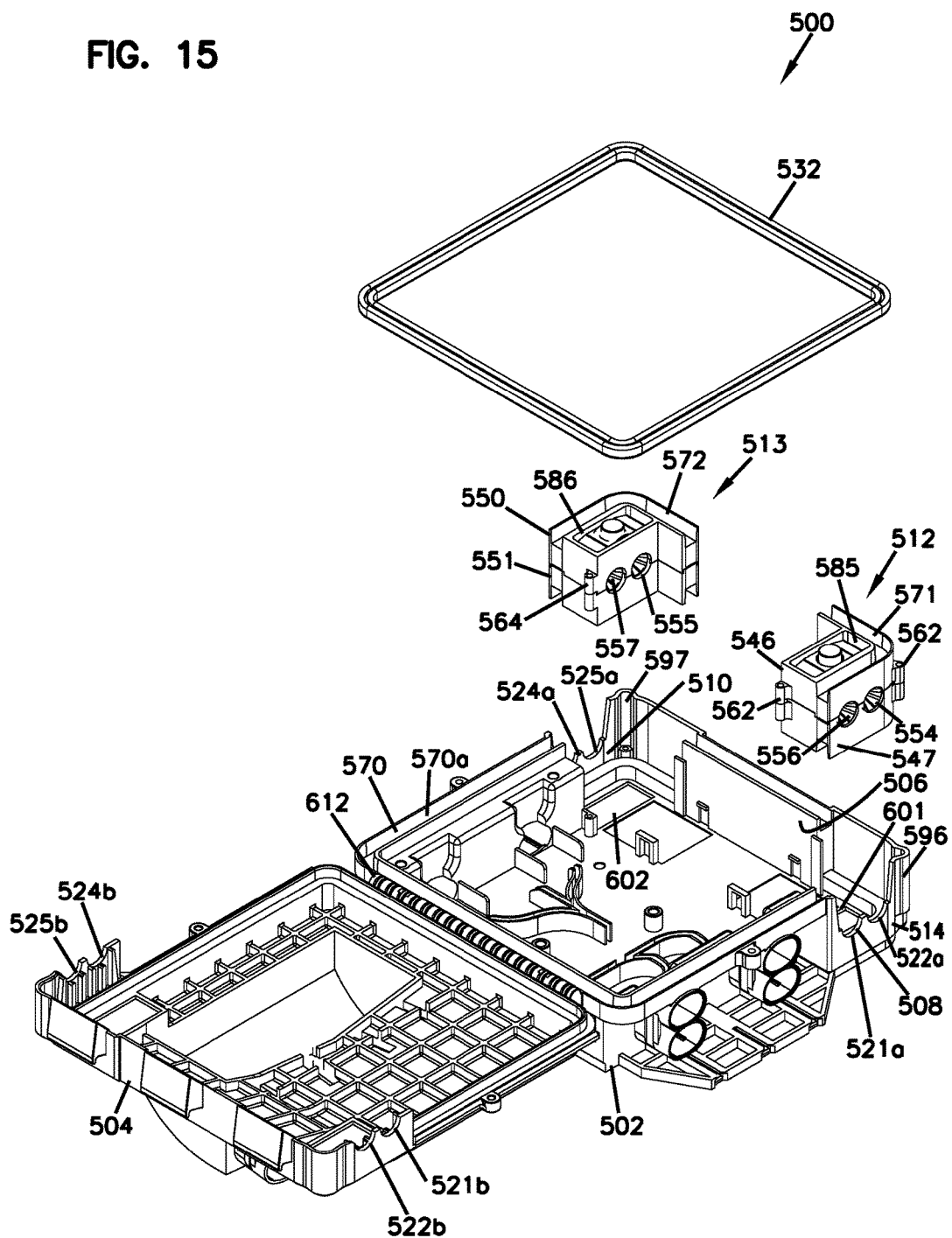
FIG. 15 is a perspective view similar to FIG. 13 and showing two cable sealing units and a perimeter sealing gasket exploded from the enclosure.
Figure 16:
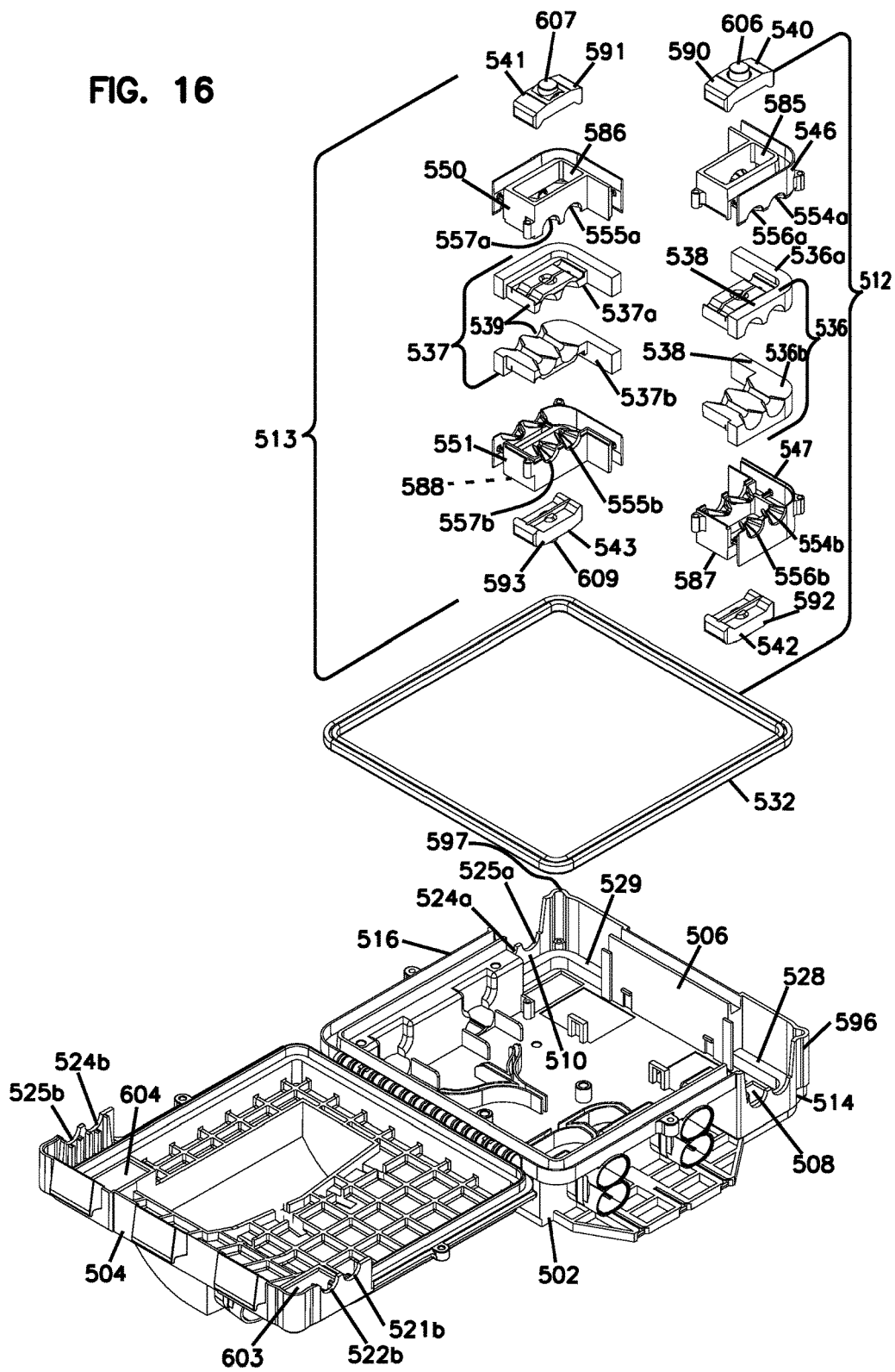
FIG. 16 is a perspective exploded view similar to FIG. 15 and also showing the two cable sealing units with the parts exploded.

In accordance with principles of this disclosure, the first housing piece 502 defines at least one sealing unit mount 508 (FIGS. 15 and 16). The at least one sealing unit mount 508 includes structure for removably holding in place a cable sealing unit 512 (described further below). Many embodiments are possible. In the example illustrated, the first housing piece 502 defines two sealing unit mounts 508, 510. The two sealing unit mounts 508, 510 are illustrated as being located on opposite sides 514, 516 of the first housing piece 502 and within the interior volume 506. In the illustrated embodiment, the sealing unit mounts 508, 510 are located in respective corners 596, 597 of the first housing piece 502. The sealing unit mount 508 holds cable sealing unit 512, and the sealing unit mount 510 holds cable sealing unit 513 (each described further below).

Figure 20:
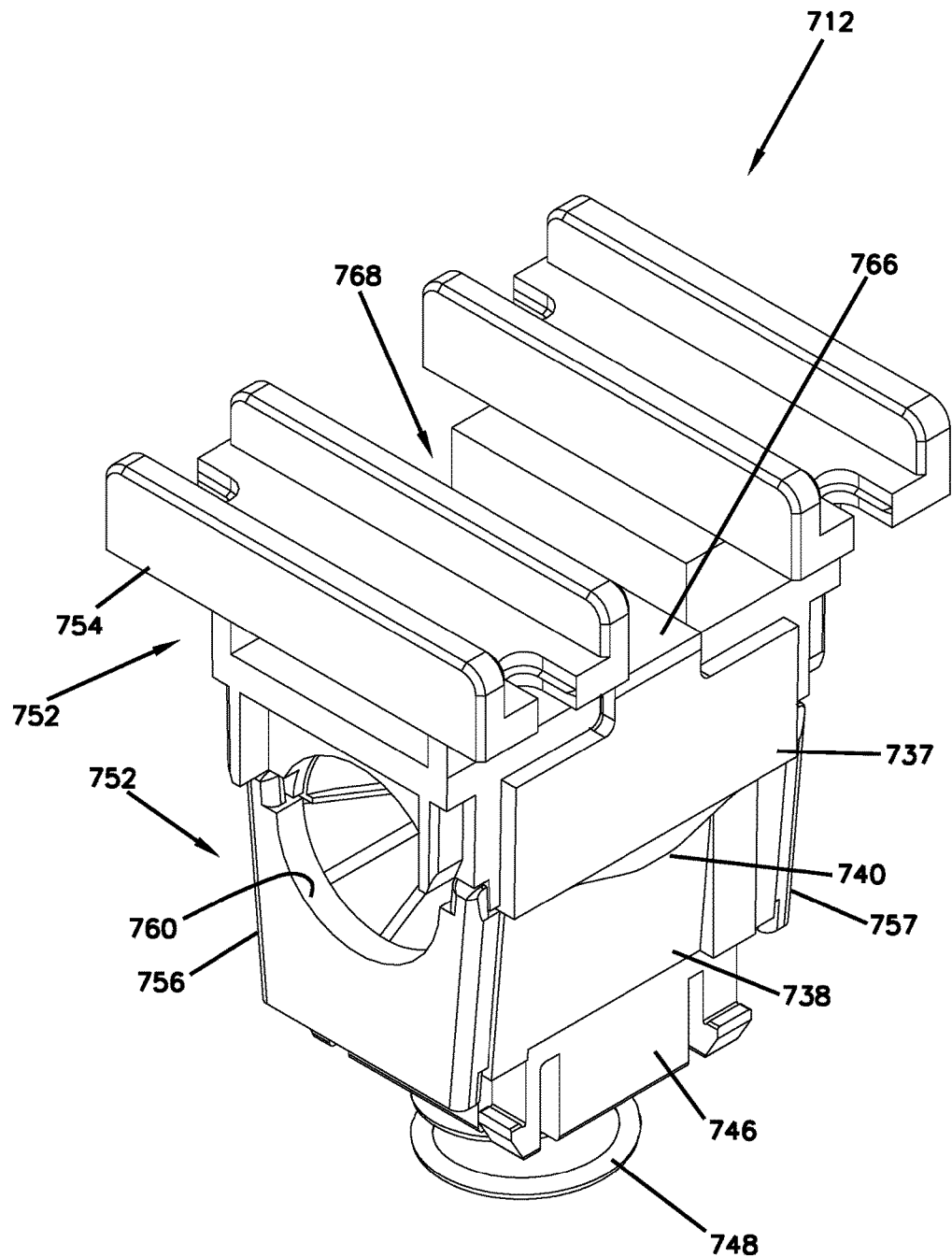
FIG. 20 is a perspective view showing an example cable sealing unit used with the enclosure of FIG. 19.

The sealing unit mount 508 includes a first portion 521*a* of at least one cable port 521. While many embodiments are possible, the sealing unit mount 508 further has a first portion 522*a* of a cable port 522. The second housing piece 502 includes second portions 521*b*, 522*b* of the cable ports 521, 522 such that when the second housing piece 504 is mated with the first housing piece 502, the ports 521, 522 are defined. Similarly, the sealing unit mount 510 has a first portion 524*a*, 525*a*, while the second housing piece 502 includes second portions 524*b*, 525*b* such that when the second housing piece 504 is mated with the first housing piece 502, the ports are defined, having an identical appearance to the ports 521, 522 shown in FIG. 20, but on the opposite side 516.

The cable ports 521, 522 and the ports formed by 524*a*, 524*b*, 525*a*, 525*b* define access regions into the respective cable sealing units 512, 513. As will become apparent from the following description, one of the advantages of the described embodiment for the enclosure 500 is that once cables are sealed into place within the cable sealing units 512, 513, subsequent opening of the enclosure 500 to get access to the interior volume 506 will only minimally disturb the sealed cables within the cable sealing units 512, 513.

Figure 14:
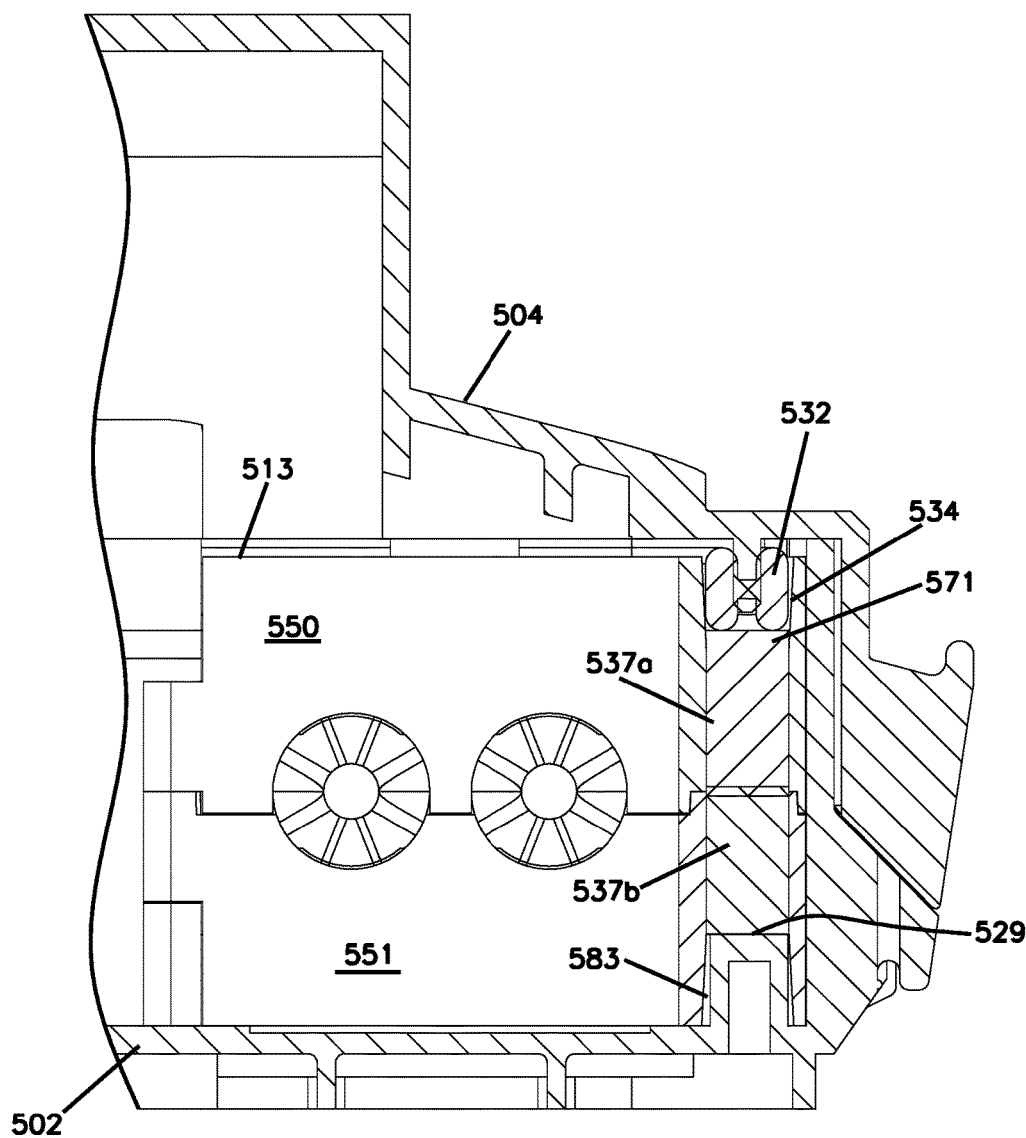
FIG. 14 is an enlarged cross-sectional view of a portion of the enclosure of FIG. 12 and showing a cable sealing unit mounted within a sealing mount of the first housing piece.

In this embodiment, each of the sealing unit mounts 508, 510 includes a projection 528 (FIG. 16), 529 (FIGS. 14, 16) that mates with, and helps to removable hold, the cable sealing units 512, 513 in place in the sealing unit mounts 508, 510. The projections 528, 529, and how they engage the sealing unit mounts 508, 510, are described further below.

In accordance with principles of this disclosure, the first and second housing pieces 502, 503 removably mate at or along a perimeter interface 530 (FIGS. 15 and 16). A perimeter sealing gasket 532 is usable along the perimeter interface 530 to create a seal 534 (FIG. 14) between the second housing piece 504 and the first housing piece 502, when the first and second housing pieces 502, 504 are mated together at the interface 530. In the example shown, the perimeter sealing gasket 532 is rectangular in shape.

The perimeter sealing gasket 532 may be made from many different types of materials. For example, the sealing gasket 432 can be made from polyurethane or a foamed polyurethane, or rubber, or a rubber-like material. In general, the gasket 532 should be sufficiently soft and elastic to deform when force is applied and elastic to return to its original form in order to create an environmental seal between the first housing piece 502 and second housing piece 504 when mated together.

The perimeter sealing gasket 532 may have, in some example embodiments, an H-shaped cross-section. See FIG. 22. In some examples, it will be made of relatively soft materials having relatively low durometer hardness values such as between 15-45 Shore A. In other examples, the gasket 532 can have a durometer hardness of about 20-40 Shore A. In certain other examples, the hardness of the gasket 532 can be between 20-30 Shore A. Examples of usable materials and properties for the gasket 532 are described in published patent application WO 2014/128137, published on 28 Aug. 2014 and incorporated herein by reference.

In this embodiment, advantages result when the perimeter sealing gasket 532 is usable for other features related to the cable sealing unit 512, 513, as will be described below.

In accordance with principles of this disclosure, each of the cable sealing units 510, 512 includes a gel arrangement 536, 537 (FIG. 16). Each of the gel arrangements includes a first volume of gel 536*a*, 537*a* and a second volume of gel 536*b*, 537*b*. The first volume of gel 536*a*, 537*a* and the second volume of gel 537*b*, 537*b* meet at and are separable from one another along a respective interface boundary 538, 539 (FIG. 16) to allow a cable to be routed between the first 536*a*, 537*a* and second 536*b*, 537*b* volumes of gel.

In FIG. 16, the first 536*a*, 537*a* and second 536*b*, 537*b* volumes of gel are illustrated, for purposes of clarity, as how they would appear within the respective cable sealing unit 512, 513 taking the shape of the container. In practice, the first 536*a*, 537*a* and second 536*b*, 537*b* volumes of gel are not normally removable from the cable sealing units 512, 513 once they are molded within the sealing units 512, 513. They are depicted here outside of the cable sealing units 512, 513 for purposes of illustration.

The gel arrangement 536, 537 may, for example, comprise silicone gel, urea gel, urethane gel, thermoplastic gel, or any suitable gel or geloid sealing material. Gels are normally substantially incompressible when placed under a compressive force and normally flow and conform to their surroundings thereby forming sealed contact with other surfaces. Example gels include oil-extended polymers. The polymer may, for example, comprise an elastomer, or a block copolymer having relatively hard blocks and relatively elastomeric blocks. Example copolymers include styrene-butadiene or styrene-isoprene di-block or tri-block copolymers. In still other embodiments, the polymer of the gel may include one or more styrene-ethylene-propylene-styrene block copolymers. Example extender oils used in example gels may, for example, be hydrocarbon oils (e.g., paraffinic or naphthenic oils or polypropene oils, or mixtures thereof). There may also include additives such as moisture scavengers, antioxidants, tackifiers, pigments and/or fungicides. In certain embodiments, gels used in accordance with the principles of the present disclosure have ultimate elongations greater than 100 percent with substantially elastic deformation to an elongation of at least 100 percent. In other embodiments, sealing members in accordance with the principles of the present disclosure have ultimate elongations of at least 200 percent, or at least 500 percent, or at least 1000 percent. Ultimate elongation can be determined by the testing protocol set forth at ASTM D412.

In many preferred embodiments, the gel arrangement 536, 537 is a different composition and possesses different physical and mechanical properties than the perimeter sealing gasket 532. In some examples, the gasket 532 has a composition that is not a gel; is non-gelatinous; is gel-free; and is does not include gel. In some examples, the gasket 532 is less tacky than the gel arrangement 536, 537. In some examples, the gasket 532 is less gummy than the gel arrangement 536, 537. In some examples, the gasket 532 is less viscous than the gel arrangement 536, 537.

In accordance with principles of this disclosure, each of the cable sealing units 512, 513 includes at least one actuator 540, 541 (FIG. 16) for applying spring load to the gel arrangement 536, 537 when the first and second housing pieces 502, 504 are mated or mounted together. The spring load helps to seal the cables that are between the first 536a, 537a and second 536b, 537b volumes of gel. Many embodiments are possible, and in the arrangement illustrated, each of the cable sealing units 512, 513 includes another actuator 542, 543. In example embodiments, for each cable sealing unit 510, 512, one the actuators 540, 541 is oriented for actuation by force (engagement with) from the second housing piece 504, and the other of the actuators 542, 543 is oriented for actuation by force (engagement with) from the first housing piece 502 when the first and second housing pieces 502, 504 are mated together. This is described in more detail below.

In accordance with principles of this disclosure, each of the cable sealing units 512, 513 includes a respective first frame section 546, 550 and a mating second frame section 547, 551. Each of the first frame sections 546, 550 supports, holds, or contains the first volume of gel 536a, 537a. Each of the second frame sections 547, 551 supports, holds, or contains the second volume of gel 536b, 537b.

The first 546, 550 and second 547, 551 mating frame sections cooperate to define at least one cable port 554, 555. Many embodiments are possible. In the example shown, the first 546, 550 and second 547, 551 mating frame sections cooperate to define at least an additional cable port 556, 557. In the example embodiment shown, each of the first frame sections 546, 550 defines respective first port sections 554a, 556a; and 555a, 557a. Each of the second frame sections 547, 551 defines respective second port sections 554b, 556b; and 555b, 557b. The frame sections 554a, 554b; 555a, 555b; 556a, 556b; and 557a, 557b together define the ports 554, 555, 556, and 557.

In the example embodiment illustrated, the cable port 554 aligns with the port 522 formed by the first and second housing pieces 502, 504; and the cable port 556 aligns with the port 521 formed by the first and second housing pieces 502, 504. Similarly, the cable port 555 aligns with the ports formed by 525a, 525b of the first and second housing pieces; and the cable port 557 aligns with the ports formed by 524a, 524b of the first and second housing pieces.

Figure 17:
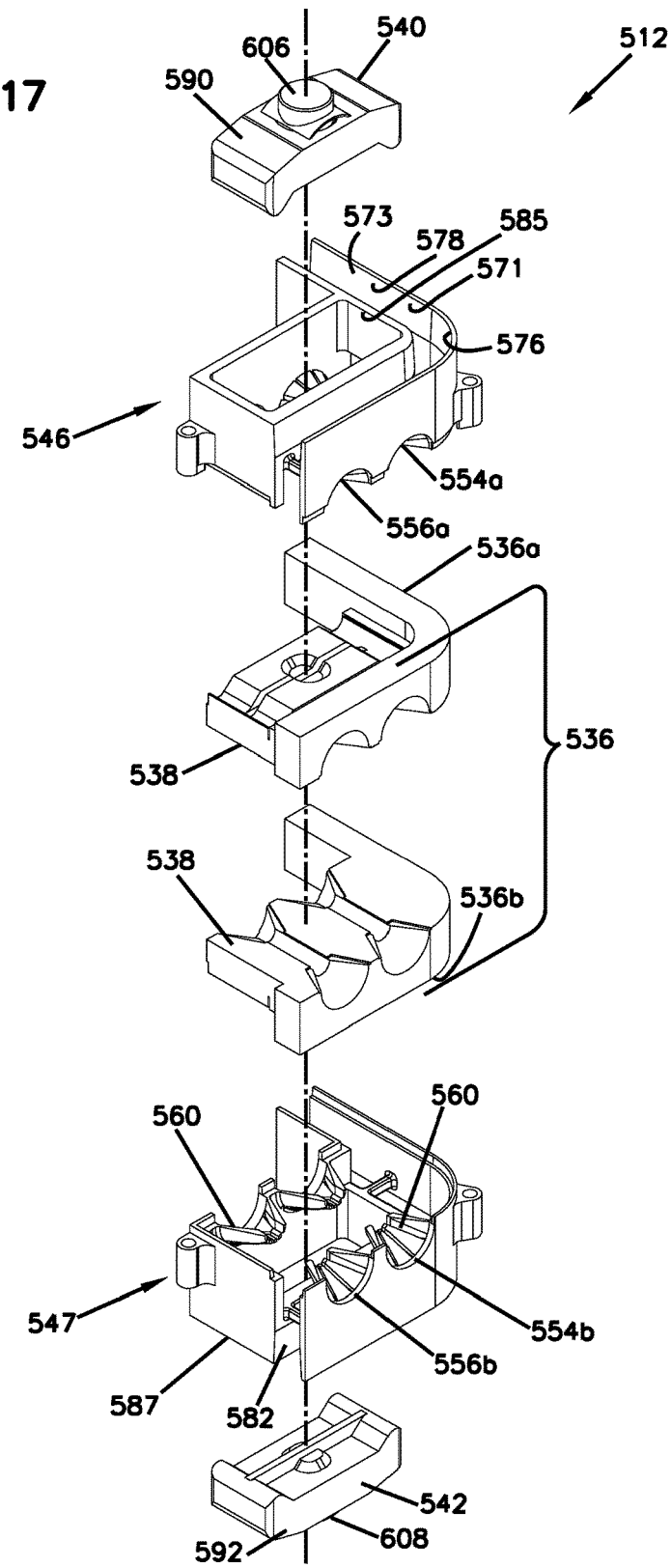
FIG. 17 is an enlarged view of one of the exploded cable sealing units of FIG. 16.

As can be seen in the exploded view of FIG. 17 for cable sealing unit 512 (cable sealing unit 513 is the same), there is other internal structure 560 within the frame sections 546, 547, 550, 551 that provide support for the gel arrangements 536, 537 and cables laid within the frame sections 546, 547, 550, 551. Many variations are possible.

In accordance with principles of this disclosure, the first frame section 546, 550 and the second frame section 547, 551 are removably connected together. In this manner, the frame sections 546, 550, 547, 551 can be separated from each other, including the gel arrangements 536, 537, and have cable laid therebetween. The gel arrangements 536, 537 stay within and are carried with their respective frame sections 546, 550, 547, 551 (e.g., first gel volume 536a stays within first frame section 546; second gel volume 536b stays within second frame section 547; first gel volume 537a stays within first frame section 550; and second gel volume 537b stays within second frame section 551). The frame sections 546, 550, 547, 551 holding the cables, with the cables ensconced, encapsulated, or surrounded by the gel arrangements 536, 537 may then be joined or mated together and secured to each other. Many embodiments are possible. In the example shown, the frame sections 546, 547 and 550, 551 are fastened together with fasteners (e.g., screws) at fastening locations 562, 564 (FIG. 15).

In accordance with principles of this disclosure, the enclosure 500 defines a perimeter channel 570 (FIG. 15). The perimeter channel 570 is defined by the at least partially by the first housing piece 502 at first housing piece channel 570a. The perimeter channel 570 is further at least partially defined by each of the first frame sections 546, 550 at channel segment 571, 572. In the arrangement shown, the first housing piece channel 570a defines a majority (i.e., greater than 50%) of the perimeter channel 570. Indeed, in many embodiments, the first housing piece channel 570a defines more than 75% of the perimeter channel 570. Of course, many embodiments are possible.

The channel segment 571, 572 in each of the first frame sections 546, 550 defines a channel volume 573, 574 (FIGS. 17, 18) that is in communication with the first volume of gel 536a, 537a. While many embodiments are possible, in the particular arrangement shown in which the sealing unit mounts 508, 510 are mounted in corners of the enclosure 500, the channel segment 571, 572 for each of the first frame sections 546, 550 coincides with the corner of the enclosure 500 and includes a curved portion 576, 577 (FIGS. 17, 18) at the corner 596, 597 (FIG. 13) of the enclosure 500.

In the example embodiment shown, the channel segment 571, 572 of the first frame section 546, 550 includes an open side 578, 579 (FIGS. 17, 18) that faces away from the first housing piece 502. In this example, the open side 578, 579 faces toward the second housing piece 504.

Figure 18:
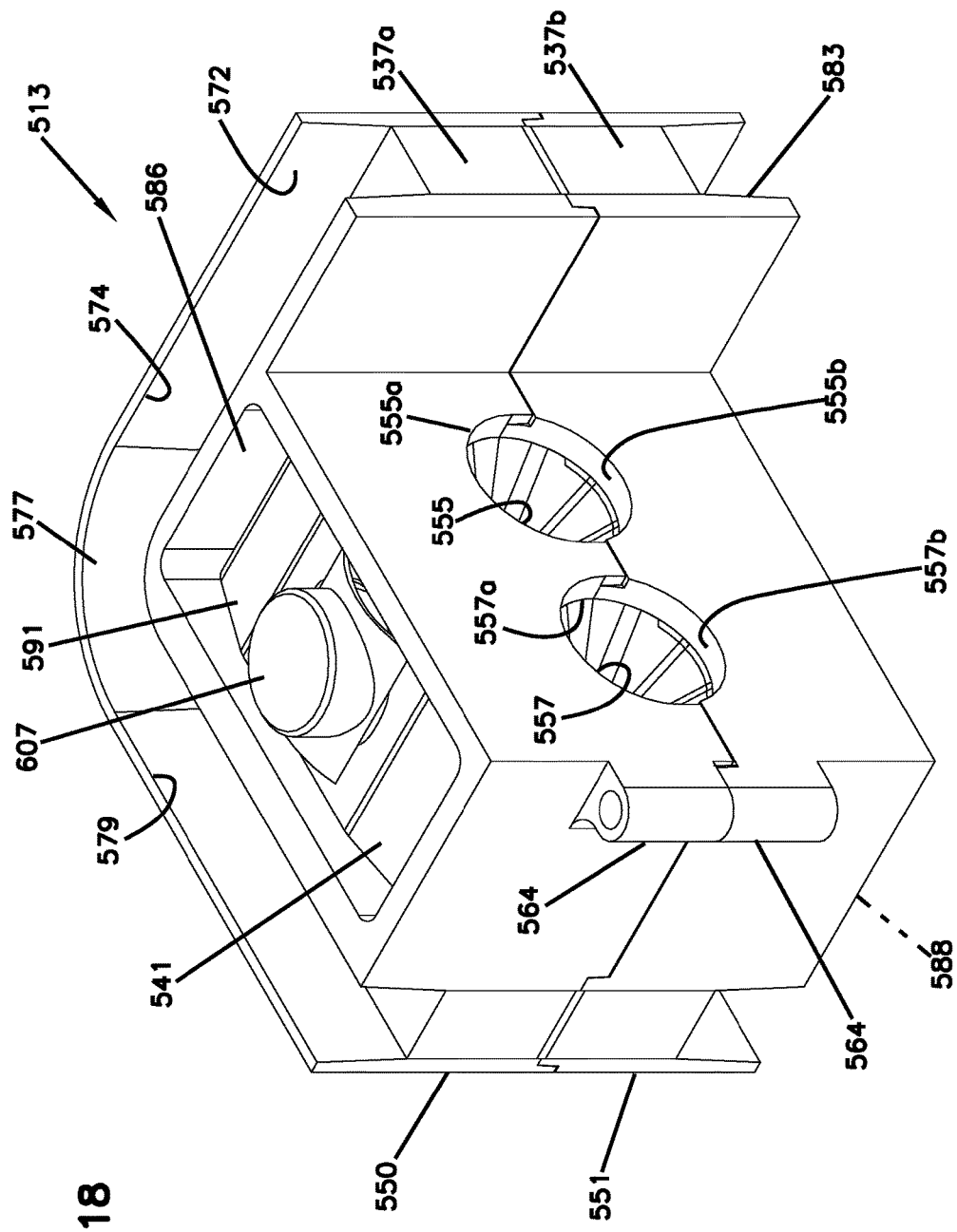
FIG. 18 is a perspective view of one of the assembled cable sealing units used in the enclosure of FIGS. 12-16.

Still in reference to FIGS. 17 and 18, and in accordance with principles of this disclosure, each of the second frame sections 547, 551 defines a respective channel segment 582, 583 that aligns with the channel segment 571, 572 of the first frame section 546, 550. The channel segment 582, 583 of each of the second frame sections 547, 551 faces toward the first housing piece 502. In this example, the channel segments 582, 583 faces away from the second housing piece 504.

As mentioned previously, the first housing piece 502 includes projections 528 (FIG. 16), 529 (FIG. 15, 16). The projections 528, 529 from the first housing piece 502 each extends within and is received by the channel segments 582, 583 of the second frame sections 547, 551 to be mated therewith. See FIG. 14, which shows the projection 529 mated with the channel segment 583 for the second frame section 551. It should be understood that the projection 528 mated with the channel segment 582 for the second frame section 547 is identical and has the same illustration.

As mentioned previously, the cable sealing units 512, 513 each includes actuators 540, 542 and 541, 543 (FIG. 16). While many embodiments are possible, in the one illustrated, each of the first frame section 546, 550 defines an actuator opening 585, 586 in communication with the first volume of gel 536a, 537a. Each of the second frame sections 547, 551 defines an actuator opening 587, 588.

While many embodiments are possible, in the arrangement shown, each of the actuators 540, 542 and 541, 543 includes a plunger 590, 592 and 591, 593 that fits within the respective actuator opening 585, 587 and 586, 588. The plunger 590, 592 and 591, 593 slides within the actuator opening 585, 587 and 586, 588 and pressurizes the gel arrangement 536, 537 with the spring load when the first 502 and second 504 housing pieces are mounted together. In convenient arrangements, the first housing piece 502 includes a surface 601, 602 (FIG. 15) that engages a respective one of the actuators 542, 543; similarly, the second housing piece includes a surface 603, 604 that engages a respective one of the actuators 540, 541 when the first 502 and second 504 housing pieces are mounted together. In certain examples, the surfaces 601-604 can be provided on pads, protrusions, or other structures.

In preferred arrangements, each of the actuators 540, 542 and 541, 543 has a spring biased button 606, 608 (FIG. 17) and 607, 609 (FIG. 16). Each of the actuators 540-543 can include a spring 616 (FIG. 17), 617 (FIG. 18) to bias each respective button 606-609. While spring 616, 617 is only clearly shown in connection with actuator 540, 541 it should be understood that in many example embodiments, each of the actuators 540-543 can have a spring like the spring 616, 617 illustrated. Many embodiments are possible. In the embodiment illustrated, the spring 616, 617 is a leaf spring, but other types of springs are usable such as a coiled spring or a torsion spring. When the first 502 and second 504 housing pieces are mounted together, the surface 601 engages button 608; surface 602 engages button 609; surface 603 engages button 606; and surface 604 engages button 607, which causes the each of the respective plungers 592, 593, 590, 591 to move against and pressurize the gel arrangements 536, 537.

Figure 22:
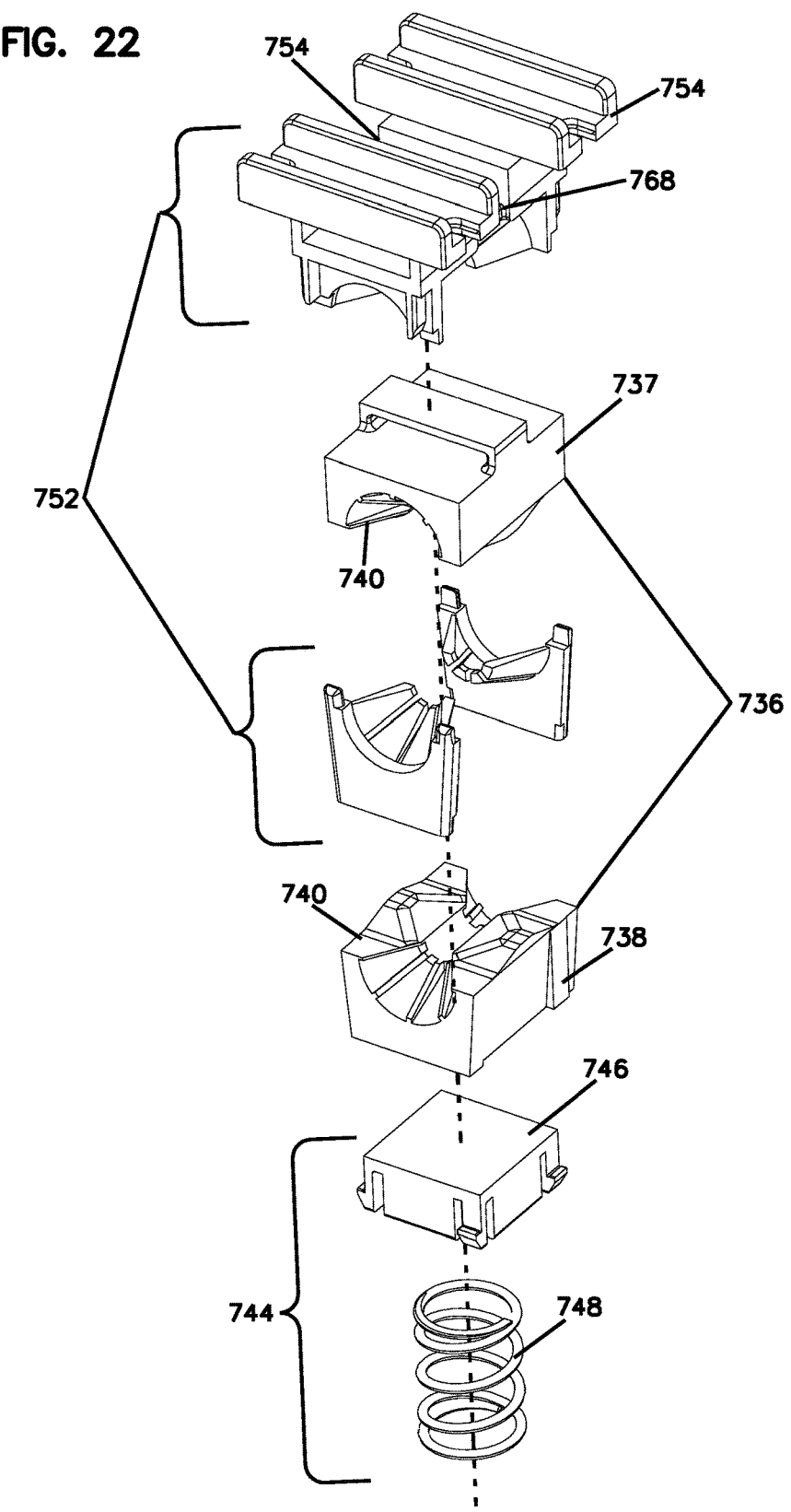
FIG. 22 is an enlarged perspective view of one of the exploded cable sealing units of FIG. 21.

In reference now to FIGS. 13 and 16, in can be appreciated that the perimeter sealing gasket 532 extends across each of the cable sealing units 512, 513 and makes contact with the respective gel arrangements 536, 537 (FIG. 16) of the cable sealing unit 512, 513. As such, the perimeter sealing gasket 532 prevents the gel arrangement 536, 537 from contacting the second housing piece 504. In FIG. 22, it can be seen how the seal 534 is formed by gasket 532 between the second housing piece 504 and the channel segment 571 of the first frame section 546 of the cable sealing unit 513. The seal 534 along perimeter channel 570a (FIG. 15) is formed directly between and against the first and second housing pieces 502, 504.

While embodiments are possible, in the one shown, the first housing piece 502 and second housing piece 504 are pivotally attached to one another along a hinge connection 612. When it is desired to access the interior volume 506 of the enclosure 500, the second housing piece 504 is pivoted away from the first housing piece 502 about the hinge connection 612. The seal 534 between the first housing piece 502 and second housing piece 504 is released, and the cables sealed within the cable sealing units 512, 513 are undisturbed and remain encapsulated within the gel arrangement 536, 537. Opening of the enclosure 500 by pivoting the second housing piece 504 relative to the first housing piece 502 will de-pressurize the gel arrangement 536, 537, but the cables remain undisturbed and encapsulated within the gel arrangement 536,357. Reclosing of the enclosure 500 with re-pressurize the gel arrangement 536, 537 within each sealing unit 512, 513. Thus, the resulting advantages can be seen by having cables remain undisturbed in the sealing units 512, 513 while having the convenience of being able to repeatedly access the interior volume 506 of the enclosure 500.

Figure 19:
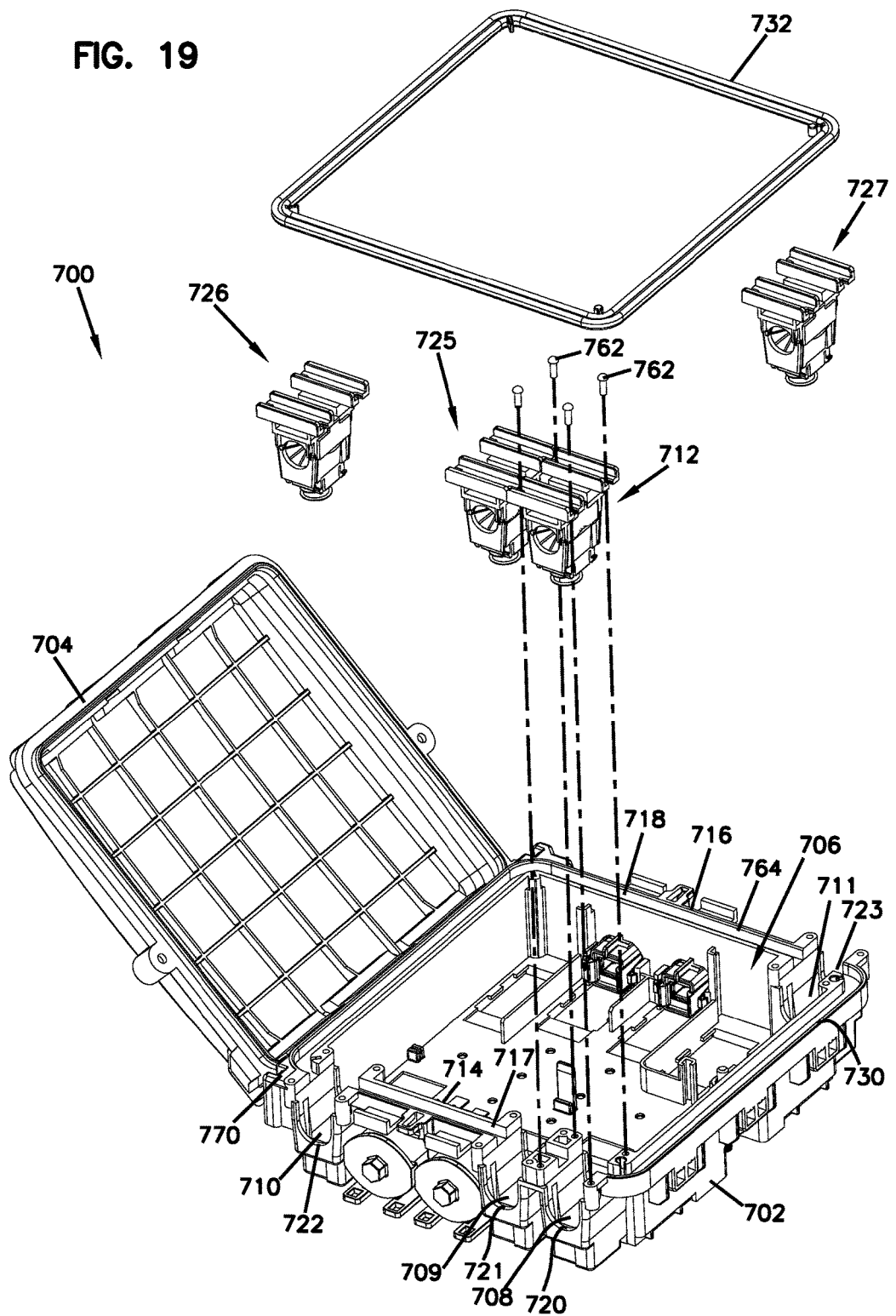
FIG. 19 is an exploded perspective view of another example enclosure opened, with a second housing piece pivoted away from a first housing piece, and depicting internal components exploded from the enclosure.

FIG. 19 illustrates another enclosure 700 constructed in accordance with the principles of this disclosure. Enclosure 700 includes at least one sealed cable port through which a cable can enter the enclosure 700. The enclosure 700 is configured to enable access to the interior without disturbing the one or more sealed cable ports. The enclosure 700 can include multiple sealed cable ports that are not disturbed when the enclosure interior is accessed.

In FIG. 19, the enclosure 700 includes a first housing piece 702 (e.g., a base), and a second housing piece 704 (e.g., a cover). In this embodiment, the enclosure 700 does not include an intermediate housing piece, although additional housing pieces could be used in alternative arrangements, but the one shown is convenient and has advantages. The first housing piece 702 and second housing piece 704 may be removably mated together to provide selective enclosure and access to an interior volume 706 defined by the two housing pieces 702, 704 when operably mated together.

In accordance with the principles of this disclosure, the first housing piece 702 defines at least one sealing unit mount 708. The at least one sealing unit mount 708 includes structure for removably holding in place a cable sealing unit 712 (described further below). Many embodiments are possible. In the example illustrated, the first housing piece 702 has four sealing unit mounts 708, 709, 710, 711. In the example illustrated, sealing units 708, 709, 710 are along a first side 714 of the first housing piece 702, while the sealing unit mount 711 is along an opposite side 716 of the first housing piece 702. In the illustrated embodiment, the sealing unit mounts 708, 709, 710, 711 coincide with straight sections 717, 718 of the enclosure 700. One, two, three, four, or more sealing unit mounts and corresponding sealing units may be provided in other embodiments.

Each of the sealing unit mounts 708, 709, 710, 711 includes a cable port 720, 721, 722, 723. The cable ports 720, 721, 722, 723 define access regions into respective cable sealing units 712, 725, 726, 727. As with the embodiment of FIGS. 12-18, in this embodiment, one of the advantages includes that once the cables are sealed into place within the cable sealing units 712, 725, 726, 727, subsequent opening of the enclosure 700 to get access to the interior volume 706 will not disturb the sealed cables within the cable sealing units 712, 725, 726, 727.

In accordance with the principles of this disclosure, the first and second housing pieces 702, 704 removably mate at or along a perimeter interface 730. A perimeter sealing gasket 732 is usable along the perimeter interface 730 to create a seal between the second housing piece 704 and the first housing piece 702, when the first and second housing pieces 702, 704 are mated together at the interface 730. In the example shown, the perimeter sealing gasket 732 is rectangular in shape.

The perimeter sealing gasket 732 may be made from many different types of materials. For example, the sealing gasket 732 can be made from polyurethane or a foamed polyurethane, or rubber, or a rubber-like material. In general, the gasket 732 should be sufficiently soft and elastic to deform when force is applied and elastic to return to its original form in order to create an environmental seal between the first housing piece 702 and the second housing piece 704 when mated together.

In some examples, the perimeter sealing gasket 732 can be made of relatively soft materials having relatively low durometer hardness values such as between 14-45 Shore A. In other examples, the gasket 732 can have a durometer hardness of about 20-40 Shore A. In certain other examples, the hardness of the gasket 732 can be between 20-30 Shore A. Examples of usable materials and properties for the gasket 732 are described in published application WO 2014/128137, published 28 Aug. 2014 and incorporated herein by reference.

In this embodiment, each of the cable sealing units 712, 725, 726, 727 are identical in construction. One of the cable sealing units, 712, will be described further below. It should be understood that the description for cable sealing unit 712 is applicable to each of the cable sealing units 725, 726, 727.

Figure 21:
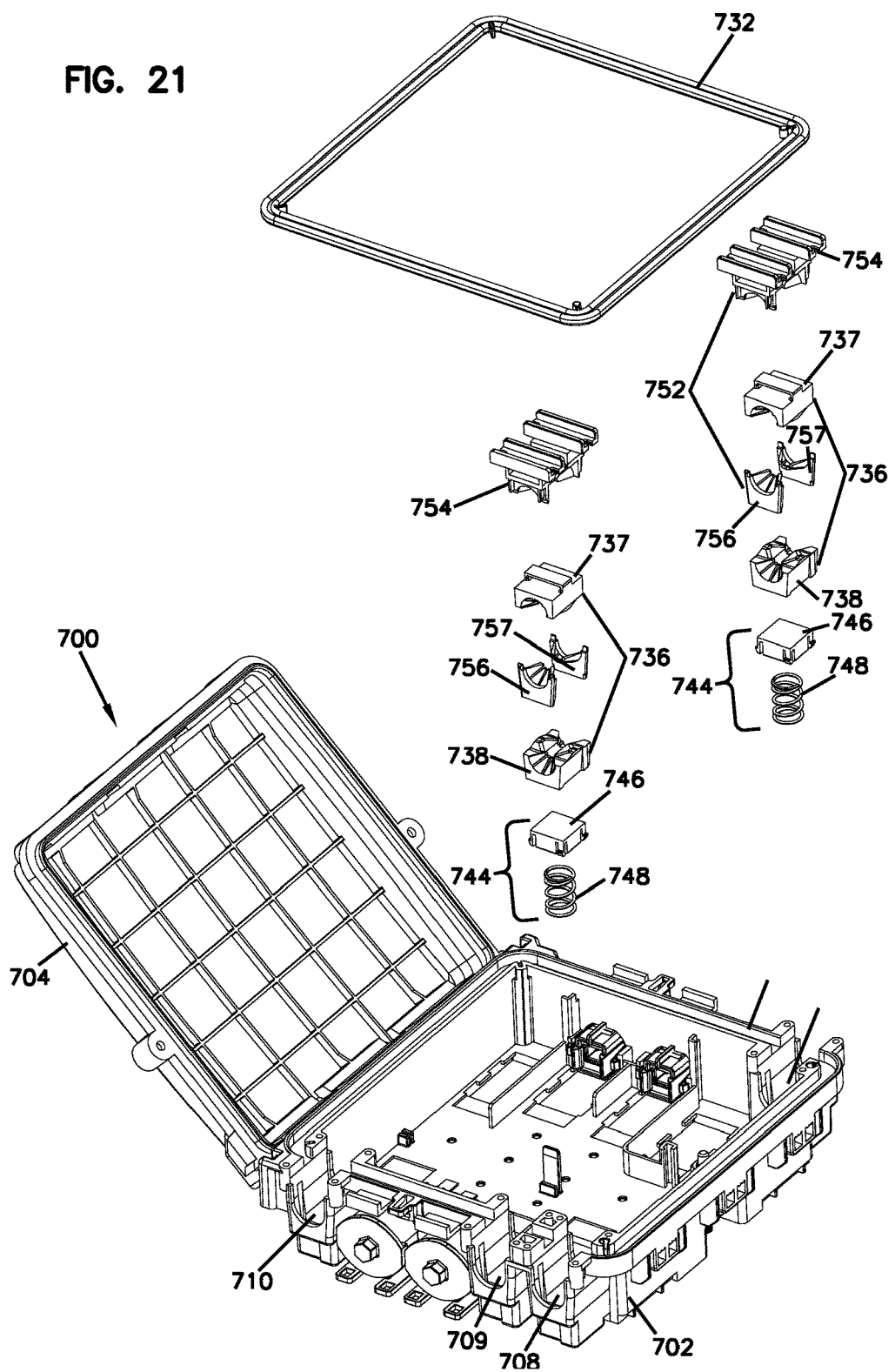
FIG. 21 is an exploded perspective view of the enclosure, similar to the view of FIG. 19, but showing the cable sealing units with their parts exploded.

Each of the cable sealing units 712, 725, 726, 727 includes a gel arrangement 736 (FIG. 22). Each gel arrangement 736 includes a first volume of gel 737 and second volume of gel 738. The first volume of gel 737 and the second volume of gel 738 meet at and are separable from one another along a respective interface boundary 740 to allow a cable to be routed between the first volume of gel 737 and second volume of gel 738. In FIGS. 21 and 22 the first volume of gel 737 and second volume of gel 738 are illustrated, for purposes of clarity, as how they would appear within the cable sealing unit 712, 725, 726, 727 taking the shape of the container. In practice, the first volume of gel 737 and second volume of gel 738 are not normally removable from the cable sealing units 712, 725, 726, 727 once they are molded within the sealing units. They are depicted here outside of the cable sealing units 712, 725, 726, 727 for purposes of illustration.

The gel arrangements 736 may comprise the same type of gel described with respect to the embodiment of FIGS. 12-18 for gel arrangement 536, 537, the description being incorporated herein by reference. As with the embodiment of FIGS. 12-18, the gel arrangement 736 is a different composition and possesses different physical and mechanical properties than the perimeter sealing gasket 732. The gasket 732 has a composition that is not a gel; is non-gelatinous; is gel-free; and does not include gel. The gasket 732 is less tacky than the gel arrangement 736. The gasket 732 is less gummy and less viscous than the gel arrangement 736.

In accordance with the principles of this disclosure, each cable sealing unit 712, 725, 726, 727 includes an actuator 744. The actuator 744 applies a spring load to the gel arrangement 736. Many embodiments are possible. In this embodiment, the actuator includes a spring plate 746 and a spring 748. The spring 748 is illustrated as a coiled spring, but other types of springs are usable such as a leaf spring or a torsion spring. A spring post 750 (FIGS. 23 and 24) extends from the first housing piece 702 and holds the spring 748 in place. As further described below, the spring 748 is biased to urge against the spring plate 746 and against the gel arrangement 736 to help the gel arrangement 736 maintain a sealing relationship with cables within the cable sealing unit 712, 725, 726, 727. The spring plate 746 is snapped into place in the first housing piece 702 and captures the spring 748 within the mount. The spring plate 746 retains the spring 748 in a pre-loaded state but can slide relative to the first housing piece 702 to allow further compression of the spring 748.

In accordance with principles of this disclosure, each of the cable sealing units 712, 725, 726, 727 includes a sealing unit frame 752 having a frame section 754 and first and second end pieces 756, 757. The frame section 754, first end piece 756, and second end piece 757 support the gel arrangement 736 and cooperate to define cable port 760 in alignment with the interface boundary 740 defined between the first and second volumes of gel 737, 738. Many embodiments are possible. In this embodiment, the frame section 754 supports the first volume of gel 737 and is removably secured to the first housing piece 702. The spring plate 746 supports the second volume of gel 738, while the first and second end pieces 756, 757 are along the axial ends of each of the first volume of gel 737 and second volume of gel 738. The frame section 754 is removably secured or fixed to the first housing piece 702 by a plurality of fasteners 762 (FIG. 19). The fasteners 762 can be screws or other suitable fasteners. Tightening of the fasteners 762 forces the frame section 754 down, causing compression of the spring 748 and pressurization of the gel arrangement 736.

When the frame section 754 is secured to the first housing piece 702, the gel arrangement 736 is trapped or sandwiched between the frame section 754 and the spring plate 746. The spring 748 is compressed, such that it pushes against the spring plate 746 and the gel arrangement 736. Because the frame section 754 is secured to the first housing piece 702, the gel arrangement 736 is pressurized to help hold cables in the cable sealing units 712, 725, 726, 727 sealed undisturbed, encapsulated, and pressurized within the gel arrangement 736. Thus, the cables remain undisturbed and pressurized in the sealing units 712, 725, 726, 727, while the user has the convenience of being able to repeatedly access the interior volume 706 of the enclosure 700. Pressurization of the gel arrangement 736 is not dependent on the cover 704 being closed.

Figure 23:
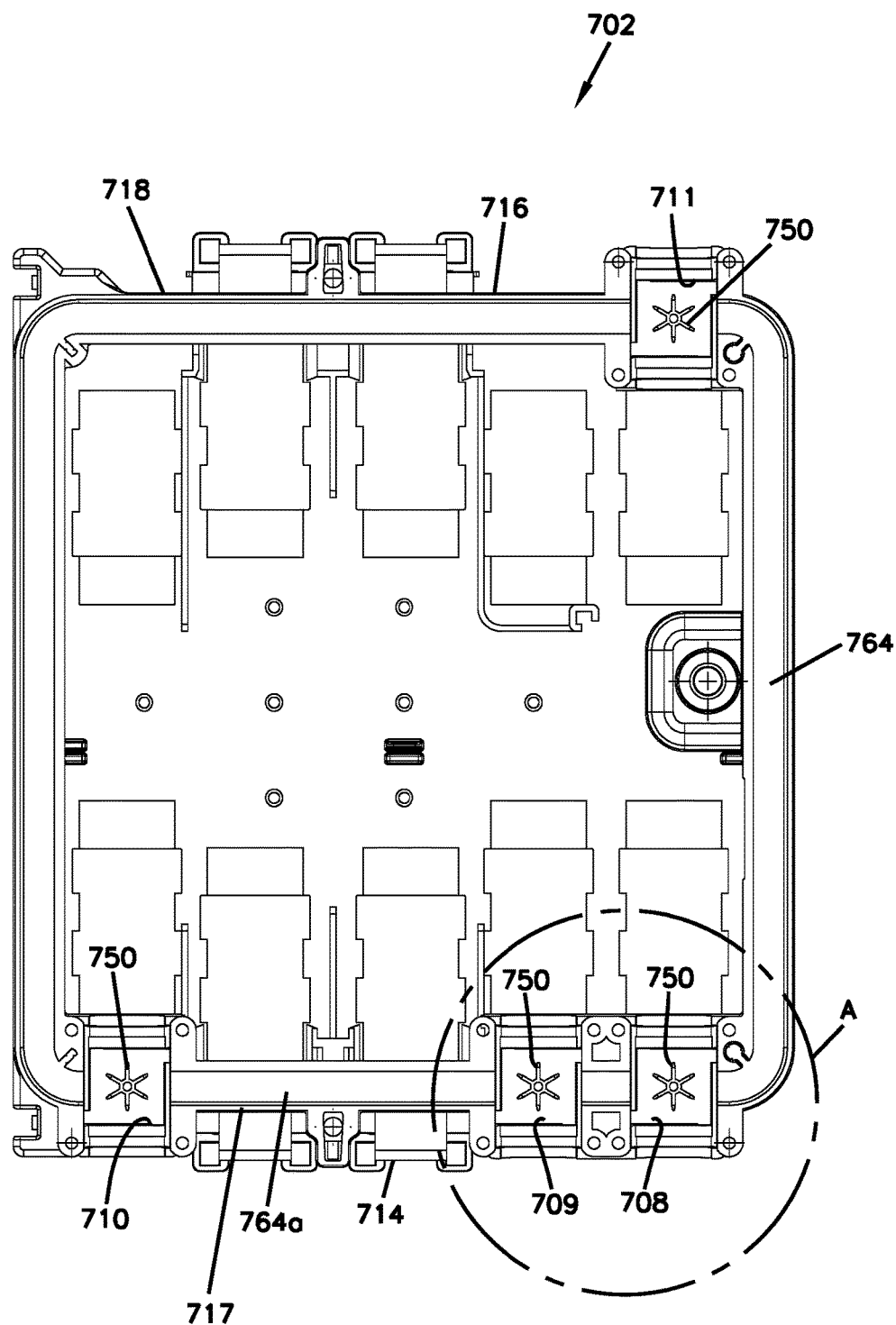
FIG. 23 is a top plan view of the first housing piece depicted in FIG. 19.
Figure 24:
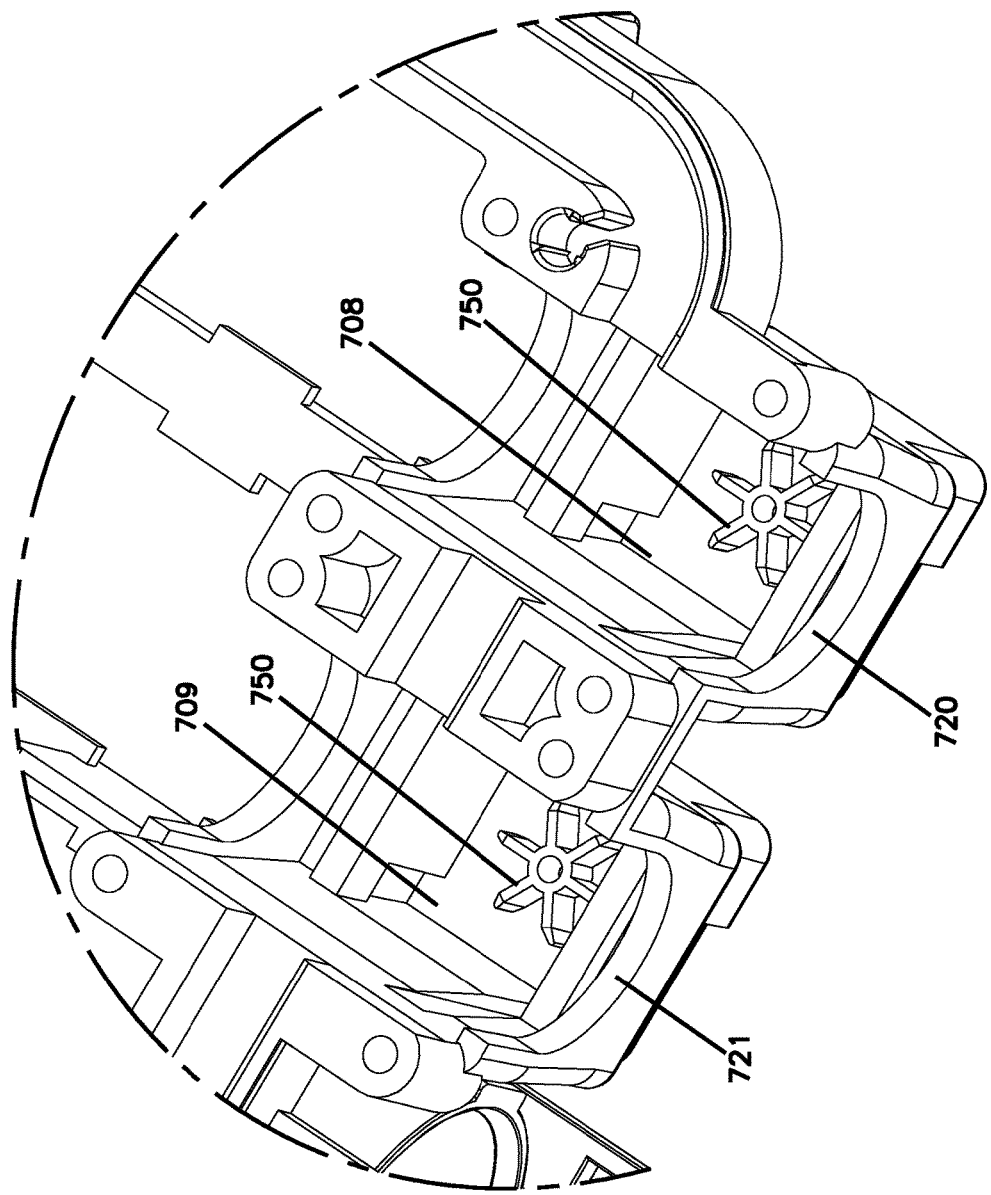
FIG. 24 is an enlarged perspective view of the region shown in section A of FIG. 23 and showing posts used to hold a spring.

In accordance with principles of this disclosure, the enclosure 700 defines a perimeter channel 764. The perimeter channel 764 is at least partially defined by the first housing piece 702 at first housing piece channel 764a (FIG. 23). The perimeter channel 764 is further at least partially defined by each of the frame sections 754 at channel segment 766 (FIG. 22). In the arrangement shown, the first housing piece channel 764a defines a majority (i.e., greater than 50%) of the perimeter channel 764. In the embodiment of FIG. 19, along the straight section 717, the channel segments 766 of the cable sealing units 712, 725, 726 together define more than 25% of the perimeter channel 764 along that side 714. Of course, many embodiments are possible.

The channel segment 766 in the frame section 754 defines a channel volume 768 (FIG. 20) that is in communication with the first volume of gel 737. While many embodiments are possible, in the particular arrangement shown in which the sealing unit mounts 708, 709, 710, 711 are mounted along straight sections 717, 718 of the enclosure 700, the channel segment 766 coincides with straight sections of the enclosure 700.

The channel segment 766 includes an open side that faces away from the first housing piece 702. In this example, the open side faces toward the second housing piece 704.

When the cable sealing units 712, 725, 726, 727 are operably assembled in their respective sealing unit mounts 708, 709, 710, 711, it can be appreciated that the perimeter sealing gasket 732 extends across each of the cable sealing units 712, 725, 726,727 and makes contact with the respective gel arrangements 736. As such, the perimeter sealing gasket 732 prevents the gel arrangement 736 from contacting the second housing piece 704.

The first housing piece 702 and the second housing piece 704 are pivotally attached to one another along a hinged connection 770. When it is desired to access the interior volume 706 of the enclosure 700, second housing piece 704 is pivoted away from the first housing piece 702 about the hinge connection 770. The seal formed by gasket 732 between the first housing piece 702 and second housing piece 704 is released, while the cables sealed within the cable sealing units 712, 725, 726, 727 are undisturbed and remain encapsulated and pressurized within the gel arrangement 736.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An enclosure comprising:
a first housing piece defining a sealing unit mount;
a second housing piece that mates with the first housing piece at a perimeter interface;
a cable sealing unit that mounts within the sealing unit mount, the cable sealing unit including a gel arrangement; and
a perimeter sealing gasket routed along the perimeter interface for sealing between the first and second housing pieces when the first and second housing pieces are mated together at the perimeter interface, the perimeter sealing gasket extending across the cable sealing unit and making contact with the gel arrangement of the cable sealing unit, and the perimeter sealing gasket preventing the gel arrangement from contacting the second housing piece; and
wherein the first housing piece defines a channel for receiving the perimeter sealing gasket, and wherein the cable sealing unit includes a sealing unit frame supporting the gel arrangement, wherein the sealing unit frame includes a channel section that aligns with the channel and receives a segment of the perimeter sealing gasket, and wherein the gel arrangement includes pre-formed and pre-shaped gel including a channel portion that fits within the channel section of the cable sealing unit and that contacts the segment of the perimeter sealing gasket, the channel portion having a length that coincides with a length of the channel section such that the channel portion contacts the perimeter sealing gasket along the length of the channel section.

2. The enclosure of claim 1, further comprising a spring for pressuring the gel arrangement.

3. The enclosure of claim 1, wherein the gel arrangement pressurization is not dependent upon relative positioning of the first and second housing pieces.

4. The enclosure of claim 1, further comprising a fastening arrangement that retains the gel arrangement in a pressurized state regardless of whether the enclosure is opened or closed.

5. The enclosure of claim 1, wherein the gel arrangement includes gel that is more tacky than the perimeter sealing gasket.

6. The enclosure of claim 1, further comprising a plurality of the cable sealing units.

7. The enclosure of claim 1, wherein the cable sealing unit or cable sealing units are at a corner or at corners of the enclosure.

8. The enclosure of claim 1, wherein the cable sealing unit or cable sealing units are at a straight section or at straight sections of the enclosure.

9. The enclosure of claim 1, wherein the gel arrangement has a wrap-around configuration for allowing the gel arrangement to be installed over a cable.

10. The enclosure of claim 1, wherein the enclosure is configured for providing fiber loop storage for optical fibers of a pass-through cable.

11. The enclosure of claim 1, wherein the gel arrangement includes first and second volumes of gel that are separable from one another and between which cables can be routed, wherein the sealing unit frame includes first and second frame sections respectively supporting the first and second volumes of gel, and wherein the first volume of gel is molded in the first frame section and the second volume of gel is molded in the second frame section.

12. An enclosure comprising:
a first housing piece defining a sealing unit mount;
a second housing piece that mates with the first housing piece at a perimeter interface;
a cable sealing unit that mounts within the sealing unit mount, the cable sealing unit including a gel arrangement including first and second volumes of gel that meet at an interface boundary, the first and second volumes of gel being separable from one another at the interface boundary to allow a cable to be routed between the first and second volumes of gel; and
a perimeter sealing gasket routed along the perimeter interface for sealing between the first and second housing pieces when the first and second housing pieces are mated together at the perimeter interface, the perimeter sealing gasket extending across the cable sealing unit and making contact with the gel arrangement of the cable sealing unit, and the perimeter sealing gasket preventing the gel arrangement from contacting the second housing piece;
wherein the cable sealing unit includes a sealing unit frame having a first and second mating frame sections, wherein the first frame section supports the first volume of gel and the second frame section supports the second volume of gel, wherein the first and second mating frame sections cooperate to define at least one cable port in alignment with the interface boundary defined between the first and second volumes of gel; and
wherein the enclosure defines a perimeter channel for receiving the perimeter sealing gasket, wherein a majority of the perimeter channel is defined by the first housing piece, wherein the first frame section defines a channel segment that forms a portion of the perimeter channel, and wherein the channel segment defines a channel volume that is in communication with the first volume of gel.

13. The enclosure of claim 12, wherein the cable sealing unit includes an actuator for applying a spring load to the gel arrangement when the first and second housing pieces are mounted together.

14. The enclosure of claim 12, wherein the cable sealing unit includes an actuator for applying a spring load to the gel arrangement when the first and second housing pieces are mounted together, wherein the first frame section defines an actuator opening in communication with the first volume of gel, wherein the actuator includes a plunger that fits within the actuator opening, and wherein the plunger slides within the actuator opening to pressurize the gel arrangement with the spring load when the first and second housing pieces are mounted together.

15. The enclosure of claim 12, wherein second frame section defines a channel segment that aligns with the channel segment of the first frame section, wherein the channel segment of the first frame section includes an open side that faces away from the first housing piece, where the channel segment of the second frame section faces toward the first housing piece, and wherein the first housing piece includes a projection that mates with the channel segment of the second frame section.

16. The enclosure of claim 15, wherein the sealing unit mount is at a corner of the enclosure, and wherein the channel segment of the first frame section coincides with the corner of the enclosure and includes a curved portion at the corner of the enclosure.

17. The enclosure of claim 12, wherein the cable sealing unit includes an actuator for applying a spring load to the gel arrangement.

18. An enclosure comprising:
a first housing piece defining a sealing unit mount;
a second housing piece that mates with the first housing piece at a perimeter interface;
a cable sealing unit that mounts within the sealing unit mount, the cable sealing unit including a gel arrangement including first and second volumes of gel that meet at an interface boundary, the first and second volumes of gel being separable from one another at the interface boundary to allow a cable to be routed between the first and second volumes of gel; and
a perimeter sealing gasket routed along the perimeter interface for sealing between the first and second housing pieces when the first and second housing pieces are mated together at the perimeter interface, the perimeter sealing gasket extending across the cable sealing unit and making contact with the gel arrangement of the cable sealing unit, and the perimeter sealing gasket preventing the gel arrangement from contacting the second housing piece;
wherein the cable sealing unit includes a sealing unit frame having a frame section and first and second end pieces, wherein the frame section, the first end piece and the second end piece support the gel arrangement and cooperate to define at least one cable port in alignment with the interface boundary defined between the first and second volumes of gel; and
wherein the enclosure defines a perimeter channel for receiving the perimeter sealing gasket, wherein a majority of the perimeter channel is defined by the first housing piece, wherein the frame section defines a channel segment that forms a portion of the perimeter channel, and wherein the channel segment defines a channel volume that is in communication with the first volume of gel.

19. The enclosure of claim 18, wherein:
(a) the frame section supports the first volume of gel and is removably secured to the first housing piece; and
(b) the cable sealing unit includes an actuator applying a spring load to the gel arrangement, the actuator including a spring plate and a spring;
(i) the spring plate supporting the second volume of gel; and
(ii) the spring being between the first housing piece and the spring plate and urging the spring plate against the gel arrangement and the frame section.

20. The enclosure of claim 19, further including a spring post extending from the first housing piece and holding the spring.

21. The enclosure of claim 19, wherein the sealing unit mount is along a straight section of the enclosure, and wherein the channel segment of the first frame section coincides with the straight section of the enclosure.

* * * * *